(12) United States Patent  
Richman

(10) Patent No.: US 11,006,770 B2  
(45) Date of Patent: May 18, 2021

(54) SELF-LOCKING HANGING DEVICE AND RELATED METHODS

(71) Applicant: Ryan Richman, Delmar, NY (US)

(72) Inventor: Ryan Richman, Delmar, NY (US)

( * ) Notice: Subject to any disclaimer, the term of this patent is extended or adjusted under 35 U.S.C. 154(b) by 0 days.

(21) Appl. No.: 17/023,571

(22) Filed: Sep. 17, 2020

(65) Prior Publication Data

US 2021/0000269 A1     Jan. 7, 2021

Related U.S. Application Data

(63) Continuation of application No. PCT/US2019/024158, filed on Mar. 26, 2019, which
(Continued)

(51) Int. Cl.
| | |
|---|---|
| *A47G 1/20* | (2006.01) |
| *F16B 45/02* | (2006.01) |
| *F16B 5/12* | (2006.01) |
| *A47G 1/16* | (2006.01) |
| *F16B 45/04* | (2006.01) |

(52) U.S. Cl.
CPC ............. *A47G 1/20* (2013.01); *A47G 1/1633* (2013.01); *F16B 5/123* (2013.01); *F16B 45/02* (2013.01); *F16B 45/04* (2013.01); *A47G 2001/207* (2013.01)

(58) Field of Classification Search
CPC .. A47G 1/20; A47G 1/1633; A47G 2001/207; F16B 5/123; F16B 45/02; F16B 45/04
See application file for complete search history.

(56) References Cited

U.S. PATENT DOCUMENTS

| | | | |
|---|---|---|---|
| 4,420,138 A | 12/1983 | Sobel | |
| 4,712,761 A | 12/1987 | Wassell | |
| (Continued) | | | |

FOREIGN PATENT DOCUMENTS

| | | |
|---|---|---|
| CN | 107687473 | 2/2018 |
| DE | 102010028363 | 11/2011 |
| WO | 2007113179 | 10/2007 |

OTHER PUBLICATIONS

International Search Report issued in PCT/US2019/024158 dated Jun. 21, 2019.
Written Opinion issued in PCT/US2019/024158 dated Jun. 21, 2019.

*Primary Examiner* — Anita M King
(74) *Attorney, Agent, or Firm* — Heslin Rothenberg Farley & Mesiti P.C.; Kristian E. Ziegler, Esq.

(57) ABSTRACT

A self-locking device for hanging objects on a mounting surface is disclosed. The self-locking device includes a mounting bracket and a locking arm member engaged with a track portion of the mounting bracket. The track portion comprising a pair of guide portions, a pair of lip portions extending from a lower end of the guide portions, a pair of rotation portions extending from an upper end of the guide portions, and a slot extending between the pairs of guide portions, lip portions and rotation portions. The arm member being mated with the track portion such that the arm member is translatable along the track portion. The arm member comprising a tip portion, a base portion positioned at least partially within the slot, and at least two pairs of projections extending from the base portion that engage with one of the pairs of guide portions, lip portions and rotation portions.

20 Claims, 15 Drawing Sheets

Related U.S. Application Data is a continuation-in-part of application No. 15/936,405, filed on Mar. 26, 2018.

(56) References Cited

U.S. PATENT DOCUMENTS

| | | | |
|---|---|---|---|
| 6,279,257 B1 | 8/2001 | Lemire | |
| 2007/0235978 A1* | 10/2007 | Mihelic | B62K 15/006 280/287 |
| 2012/0318945 A1 | 12/2012 | Vallimont | |
| 2014/0231604 A1* | 8/2014 | Long | A47G 1/1633 248/217.3 |
| 2017/0000270 A1* | 1/2017 | Will | A47B 96/02 |
| 2017/0347812 A1 | 12/2017 | Will et al. | |

* cited by examiner

SELF-LOCKING HANGING DEVICE AND RELATED METHODS

CROSS-REFERENCE TO RELATED APPLICATION

This application is a continuation of PCT International Patent No. PCT/US2019/024158, filed on Mar. 27, 2019, entitled Self-Locking Device and Related Methods, which claims priority benefit of U.S. Non-Provisional application Ser. No. 15/936,405, filed Mar. 26, 2018, entitled Self-Locking Device for Hanging Objects, which are hereby expressly incorporated herein by reference in their entireties.

TECHNICAL FIELD

The present disclosure relates generally to hardware for hanging objects on a surface. More particularly, the present disclosure relates to self-locking devices for hanging objects on a wall or other surface.

BACKGROUND

Typical hardware that is affixed to a wall or other surface for hanging an object thereon includes nails, screws, hooks and the like. When hanging an object on hanging hardware that is affixed to a surface, it may be difficult to assure that the object is seated correctly on the hanging hardware. For example, an object (such as a frame) may have a wire affixed to, and stretched across, the back thereof that is used to hang the object on the hardware. In other examples, various different types of hardware, such as hooks, D-rings, sawtooth hangers or the like, may be attached to the back of an object to hang the object on a wall or other surface. Due to the difficulty of seeing behind the object when holding the object up to the wall or other surface to mate the hanging hardware, it may be challenging to confirm that the hardware attached to the object is properly engaged with the hardware attached to the wall or other surface. In addition, there is often a risk that the hardware attached to the object may become dislodged from the wall hardware as the person hanging the objects releases the object.

Some other typical hardware that is utilized to hang an object includes clips and carabineers (e.g., spring loaded carabineers), which may be used as picture frame hangers. Some such devices are fixed in place laterally on the object itself, and typically do not lock the object onto the wall. Some other such devices comprise a dual step system including a surface/wall bracket and an object bracket that couple together to fix an object onto a surface/wall such that the object cannot move laterally. Some such devices do not lock the object onto the surface/wall. Other such devices lock the object onto the surface/wall to help prevent removal and/or theft thereof, such as through the use of specialized hardware on the surface/wall and/or on object itself and/or one or more specialized tool(s).

New and improved devices, systems, and methods for securing objects to walls or other surfaces are therefore needed to overcome the above-noted drawbacks of the currently available solutions.

SUMMARY

The present disclosure provides a self-locking device for hanging objects on a surface, such as a wall or surface that is angled with respect to horizontal (e.g., vertical, nearly vertical or partially vertical). The device may comprise a hanging arm or hook member that slidably mates within a slot of a mounting bracket. The mounting bracket is configured to removably or fixedly couple to the surface. The arm member is rotatable with respect to the mounting bracket in at least one position along the slot of the mounting bracket, and is rotatably fixed or locked with respect to the mounting bracket in at least one other position along the slot. The mounting bracket may be configured to fixedly or removably attach (and/or detach) to a wall or other surface without specialized tools or equipment. The arm member may be configured to fixedly or removably attach (and/or detach) with the mounting bracket without specialized tools or equipment.

The arm member is reconfigurable with respect to the mounting bracket from an open position to a closed and locked position. The open position of the arm member allows a portion of an object to be positioned between an open space between the mounting bracket and the arm member, and be physically supported by at least one of the mounting bracket and the arm member. In the closed and locked position of the arm member, the arm member and the mounting bracket may form an enclosed space that extends about a portion of the object, and the arm member and/or the mounting bracket may physically support the object. In some embodiments, in the closed and locked position of the arm member, the arm member may be selectively locked in the closed position such that the arm member remains in the closed position until the arm member is manually selectively reconfigured into the open position. In some other embodiments, in the closed and locked position of the arm member with a portion of the object positioned within the enclosed space, the arm member may be fixedly locked in the closed position such that the arm member cannot be manually selectively reconfigured into the open position.

The arm member may be slidable along a track portion of the mounting bracket. The track portion of the mounting bracket may define an elongated slot. The track portion may be configured to allow the arm member to rotate into the open position when in a first upper portion of the track portion, but locked in the closed positioned within other portions (e.g., lower portions) of the track portion.

In one aspect, the present disclosure provides a self-locking device for hanging an object on a mounting surface, comprising a mounting bracket for coupling to the mounting surface and a locking arm member for holding an object between the mounting bracket and the arm member. The mounting bracket comprising a front side, a back side for engaging the mounting surface, and a track portion. The track portion comprises a pair of guide portions, a pair of lip portions extending from a lower end of the guide portions and away from the front side that define free ends, a pair of rotation portions extending from an upper end of the guide portions, and a slot extending between the pairs of guide portions, lip portions and rotation portions. The locking arm member mated with the track portion of the mounting bracket such that the arm member is translatable along the track portion. The arm member comprises a tip portion, a base portion positioned at least partially within the slot, and at least two pairs of projections extending from the base portion that engage with one of the pairs of guide portions, lip portions and rotation portions depending upon the position of the arm member along the track portion. The lip portions and the arm member are configured such that when the at least two pairs of projections engage a portion of the pair of lip portions, each lip portion extends between respective pair of projections of the at least two pairs of projections, and the arm member is oriented with respect the mounting bracket such that the arm member extends through the slot and at least the tip portion is positioned past the back side of the mounting bracket. The guide portions and the arm member are configured such that when the at least two pairs of projections engage the pair of guide portions, the guide portions extend between a respective pair of projections of the at least two pairs of projections, and the arm member is oriented with respect the mounting bracket in a closed orientation with the tip portion being positioned proximate to the front side of the mounting bracket. The rotation portions and the arm member are configured such that when the at least two pairs of projections engage the pair of rotation portions, the rotation portions extend between a respective pair of projections of the at least two pairs of projections, and the arm member is freely rotatable with respect to the mounting bracket between the closed orientation and an open orientation with the tip portion being positioned distal to the front side of the mounting bracket as compared to the closed orientation.

In some embodiments, in the closed orientation, the tip portion of the arm member extends only partially through the slot, is positioned even with the front side of the mounting bracket or is spaced above the front side of the mounting bracket by less than or equal to 15 degrees. In some embodiments, in the closed orientation, the tip portion of the arm member is positioned within the slot. In some embodiments, in the closed orientation, the tip portion of the arm member is positioned even with the front side of the mounting bracket. In some embodiments, in the closed orientation, the tip portion of the arm member is spaced above the front side of the mounting bracket by less than or equal to 15 degrees. In some embodiments, in the closed orientation, the tip portion of the arm member is spaced above the front side of the mounting bracket by less than or equal to 10 degrees. In some embodiments, in the closed orientation, the tip portion of the arm member is spaced above the front side of the mounting bracket by less than or equal to 5 degrees.

In some embodiments, in the open orientation, the tip portion of the arm member is spaced above the front side of the mounting bracket by less than or equal to 120 degrees. In some embodiments, in the open orientation, the tip portion of the arm member is spaced above the front side of the mounting bracket by less than or equal to 90 degrees. In some embodiments, in the open orientation, the tip portion of the arm member is spaced above the front side of the mounting bracket by less than or equal to 45 degrees. In some embodiments, in the open orientation, the tip portion of the arm member is spaced above the front side of the mounting bracket by less than or equal to 30 degrees.

In some embodiments, the back side of the mounting bracket comprises an engagement surface for engaging the mounting surface and a recessed portion aligned with the track portion, the recessed portion comprising underside surfaces of at least the pairs of guide portions and rotation portions that are spaced from the engagement surface. In some embodiments, the lip portions are arcuate members that extend from a front face of the front side of the mounting bracket, and the lip portions each comprise an arcuately concave front face.

In some embodiments, in the closed orientation of the arm member, the arm member is configured such that a gap extends below an underside of the arm member and above the front side of the mounting bracket. In some such embodiments, in the closed orientation of the arm member, a portion of the object extends through the gap.

In some embodiments, the back side of the mounting bracket is configured to mount to the mounting surface via at least one of an adhesive material, a fastener and hook and loop material. In some embodiments, a top side of the mounting bracket comprises an arcuately convex surface that extends between the back side and the front side. In some embodiments, the track portion further comprises a support member that extends across the slot, and the rotation portions are positioned between the support member and the lip portions along the track portion. In some such embodiments, the tip portion of the arm member comprises a hook projection, and the hook projection is configured to engage the support member when the arm member is in the closed orientation and positioned in a locking position along the track portion.

In some embodiments, the arm member defines an arcuately convex shape with respect to a front side of the arm member. In some embodiments, an underside of the arm member includes a projection extending toward the front side of the mounting bracket when the arm member is in the closed orientation. In some embodiments, the mounting bracket further comprises at least one attachment aperture extending therethrough from the front side to the back side.

In some embodiments, the mounting bracket further comprises at least one hook portion extending from the front side, the at least one hook portion including at least one upper support surface configured to physically support a portion of the object thereon. In some such embodiments, the at least one hook portion comprises at pair of hook portions positioned on opposing sides of the slot. In some other such embodiments, the at least one hook portion overlaps with a rotation portion of the pair of rotation portions. In some other such embodiments, the at least one hook portion is positioned between the pair of rotation portions and the pair of lip portions along the track portion. In some other such embodiments, in the closed orientation, a portion of the arm member is positioned adjacent to the at least one hook portion and even with or below a front edge of the at least one upper support surface thereof.

In some embodiments, a first guide portion of the pair of guide portions and a first rotation recess of the pair of rotation recesses comprise contiguous and aligned first planar front surfaces at the front side of the mounting bracket on a first side of the slot, and a second guide portion of the pair of guide portions and a second rotation recess of the pair of rotation recesses comprise contiguous and aligned second planar front surfaces at the front side of the mounting bracket on a second side of the slot.

In some embodiments, the pair of rotation recesses comprise rear recesses in a back side thereof. In some such embodiments, the pair of rotation recesses comprise planar front side surfaces opposing the rear recesses. In some such other embodiments, the pair of rotation recesses each comprise a front convex end surface extending from to a respective guide portion of the pair of guide portions. In some such other embodiments, the pair of rotation recesses each comprise a rear stop end surface that is distal to a respective guide portion of the pair of guide portions configured to engage with and retain one of the projections of the pairs of projections in the rear recess thereof and retain the arm member in the open orientation.

In some embodiments, the pair of rotation recesses comprise first thicknesses extending between a front face thereof at the front side and a back face thereof at the back side, the pair of guide portions comprise second thicknesses extending between a front face thereof at the front side and a back face thereof at the back side, and the first thicknesses are less than the second thicknesses. In some such embodiments, the back faces of the pair of rotation recesses are formed by bottom surfaces of recesses.

In some embodiments, the projections of each pair of projections are spaced a first distance apart, the lip portions each define a first thickness between a front face thereof and a back face thereof, and the first distances and the first thicknesses are relatively sized such that a portion of the lip portions securely orients the arm member such that the arm member is prevented from rotating with respect to the mounting such that the tip portion of the is not positioned past the back side of the mounting bracket. In some embodiments, when the back side of the mounting bracket is coupled to and abuts the mounting surface, the mounting surface prevents the member arm from translating fully over the lip portions by preventing the arm member from orienting with respect to the mounting bracket such that the tip portion extends past the back side of the mounting bracket.

In some embodiments, the projections of each pair of projections are spaced a first distance apart, the guide portions each define a first thickness between a front face thereof and a back face thereof, and the first distances and the first thicknesses are relatively sized such that the guide portions securely orient the arm member in the closed orientation such that the arm member is prevented from rotating with respect to the mounting bracket out of the closed orientation. In some such embodiments, in the closed orientation, the tip portion of the arm member is positioned within the slot. In some other such embodiments, in the closed orientation, the tip portion of the arm member is positioned even with the front side of the mounting bracket. In some other such embodiments, in the closed orientation, the tip portion of the arm member is spaced above the front side of the mounting bracket by less than or equal to 15 degrees.

In some embodiments, the projections of each pair of projections are spaced a first distance apart, the rotation portions each define a minimum thickness between a front face thereof and a back face thereof, and the first distances and the minimum thicknesses are relatively sized such that the arm member is freely rotatable with respect to the mounting bracket between the closed orientation and the open orientation.

In some embodiments, the mounting bracket is of one-piece construction. In some embodiments, the mounting bracket comprises a front portion that defines the front side and the track portion of the mounting bracket, and a base portion that is coupled to an underside of the mounting bracket that defines the back side of the mounting bracket.

In another aspect, the present disclosure provides a method of hanging an object on a mounting surface. The method comprises obtaining a self-locking device. The self-locking device comprising a mounting bracket and a locking arm. The mounting bracket comprises a front side, a back side, and a track portion. The track portion comprises a pair of guide portions, a pair of lip portions extending from a lower end of the guide portions and away from the front side that define free ends, a pair of rotation portions extending from an upper end of the guide portions, and a slot extending between the pairs of guide portions, lip portions and rotation portions. The locking arm member comprises a tip portion, a base portion configured to be positioned at least partially within the slot, and at least two pairs of projections extending from the base portion configured to engage with one of the pairs of guide portions, lip portions and rotation portions. The method further comprises mounting the arm member on the pair of lip portions such that the base portion is positioned at least partially within the slot, each lip portion extends between a respective pair of projections of the at least two pairs of projections, and the arm member is oriented with respect the mounting bracket such that the arm member extends through the slot and at least the tip portion is positioned past the back side of the mounting bracket. The method also comprises translating the arm member along the pair of lip portions to the pair of guide portions such that each guide portion extends between a respective pair of projections of the at least two pairs of projections, and the arm member is oriented with respect the mounting bracket in a closed orientation with the tip portion being positioned proximate to the front side of the mounting bracket. The method further comprises translating the arm member along the pair of guide portions in the closed orientation to the pair of rotation portions such that each guide portion is mounted on the rotation with the rotation portions extending between a respective pair of projections of the at least two pairs of projections. The method further comprises rotating the arm member on the pair of guide portions from the closed orientation to an open orientation with the tip portion being positioned distal to the front side of the mounting bracket as compared to the closed orientation. The method further comprises positioning a portion of an object between the arm member and the front side of the mounting bracket. The method also comprises rotating the arm member on the pair of guide portions from the open orientation to the closed orientation.

In some embodiments, in the closed orientation, the tip portion of the arm member is positioned within the slot. In some embodiments, in the closed orientation, the tip portion of the arm member is positioned even with the front side of the mounting bracket. In some embodiments, in the closed orientation, the tip portion of the arm member is spaced above the front side of the mounting bracket by less than or equal to 15 degrees. In some embodiments, in the closed orientation, the tip portion of the arm member is spaced above the front side of the mounting bracket by less than or equal to 10 degrees. In some embodiments, in the closed orientation, the tip portion of the arm member is spaced above the front side of the mounting bracket by less than or equal to 5 degrees.

In some embodiments, in the open orientation, the tip portion of the arm member is spaced above the front side of the mounting bracket by less than or equal to 120 degrees. In some embodiments, in the open orientation, the tip portion of the arm member is spaced above the front side of the mounting bracket by less than or equal to 90 degrees. In some embodiments, in the open orientation, the tip portion of the arm member is spaced above the front side of the mounting bracket by less than or equal to 45 degrees. In some embodiments, in the open orientation, the tip portion of the arm member is spaced above the front side of the mounting bracket by less than or equal to 30 degrees.

In some embodiments, the method further comprises coupling the mounting bracket to the mounting surface such that the back side abuts the mounting surface after rotating the arm member on the pair of guide portions from the open orientation to the closed orientation. In some such embodiments, the back side of the mounting bracket comprises an engagement surface for abutting the mounting surface and a recessed portion aligned with the track portion, the recessed portion comprising underside surfaces of at least the pairs of guide portions and rotation portions that are spaced from the engagement surface. In some other such embodiments, the mounting bracket further comprises at least one attachment aperture extending therethrough from the front side to the back side, and coupling the mounting bracket to the mounting surface comprises driving at least one fixation member through the at least one attachment portion and into the mounting surface.

In some embodiments, positioning a portion of an object between the arm member and the front side of the mounting bracket comprises positioning the portion of the object on an underside of the arm member such that the arm member physically supports the object. In some embodiments, the track portion further comprises a support member that extends across the slot, the tip portion of the arm member comprises a hook projection, and further comprising translating the arm member along the guide portions to engage the hook projection mated with the support member after rotating the arm member on the pair of guide portions from the open orientation to the closed orientation. In some embodiments, the lip portions are arcuate members that extend from a front face of the front side of the mounting bracket, and the lip portions each comprise an arcuately concave front face.

In some embodiments, in the closed orientation of the arm member, the arm member forms a gap that extends below an underside of the arm member and above the front side of the mounting bracket. In some embodiments, a top side of the mounting bracket comprises an arcuately convex surface that extends between the back side and the front side. In some embodiments, the arm member defines an arcuately convex shape with respect to a front side of the arm member. In some embodiments, an underside of the arm member includes a projection extending toward the front side of the mounting bracket when the arm member is in the closed orientation.

In some embodiments, the mounting bracket further comprises at least one hook portion extending from the front side, the at least one hook portion including at least one upper support surface configured to physically support a portion of the object thereon, and positioning a portion of an object between the arm member and the front side of the mounting bracket comprises positioning the portion of the object on the at least one upper support surface. In some such embodiments, the at least one hook portion comprises at pair of hook portions positioned on opposing sides of the slot. In some other such embodiments, the at least one hook portion overlaps with a rotation portion of the pair of rotation portions. In some other such embodiments, the at least one hook portion is positioned between the pair of rotation portions and the pair of lip portions along the track portion. In some other such embodiments, in the closed orientation, a portion of the arm member is positioned adjacent to the at least one hook portion and even with or below a front edge of the at least one upper support surface thereof.

In some embodiments, a first guide portion of the pair of guide portions and a first rotation recess of the pair of rotation recesses comprise contiguous and aligned first planar front surfaces at the front side of the mounting bracket on a first side of the slot, and a second guide portion of the pair of guide portions and a second rotation recess of the pair of rotation recesses comprise contiguous and aligned second planar front surfaces at the front side of the mounting bracket on a second side of the slot. In some embodiments, the pair of rotation recesses comprise rear recesses in a back side thereof. In some such embodiments, the pair of rotation recesses comprise planar front side surfaces opposing the rear recesses. In some other such embodiments, the pair of rotation recesses each comprise a front convex end surface extending from to a respective guide portion of the pair of guide portions. In some other such embodiments, the pair of rotation recesses each comprise a rear stop end surface that is distal to a respective guide portion of the pair of guide portions configured to engage with and retain one of the projections of the pairs of projections in the rear recess thereof and retain the arm member in the open orientation.

In some embodiments, the pair of rotation recesses comprise first thicknesses extending between a front face thereof at the front side and a back face thereof at the back side, the pair of guide portions comprise second thicknesses extending between a front face thereof at the front side and a back face thereof at the back side, and the first thicknesses are less than the second thicknesses. In some such embodiments, the back faces of the pair of rotation recesses are formed by bottom surfaces of recesses.

In some embodiments, the projections of each pair of projections are spaced a first distance apart, the lip portions each define a first thickness between a front face thereof and a back face thereof, and the first distances and the first thicknesses are relatively sized such that a portion of the lip portions securely orients the arm member such that the arm member is prevented from rotating with respect to the mounting such that the tip portion of the is not positioned past the back side of the mounting bracket. In some embodiments, when the mounting bracket is coupled to the mounting surface, the mounting surface prevents the member arm from translating fully over the lip portions by preventing the arm member from orienting with respect to the mounting bracket such that the tip portion extends past the back side of the mounting bracket.

In some embodiments, the projections of each pair of projections are spaced a first distance apart, the guide portions each define a first thickness between a front face thereof and a back face thereof, and the first distances and the first thicknesses are relatively sized such that the guide portions securely orient the arm member in the closed orientation such that the arm member is prevented from rotating with respect to the mounting bracket out of the closed orientation. In some such embodiments, in the closed orientation, the tip portion of the arm member is positioned within the slot. In some other such embodiments, in the closed orientation, the tip portion of the arm member is positioned even with the front side of the mounting bracket. In some other such embodiments, in the closed orientation, the tip portion of the arm member is spaced above the front side of the mounting bracket by less than or equal to 15 degrees.

In some embodiments, the projections of each pair of projections are spaced a first distance apart, the rotation portions each define a minimum thickness between a front face thereof and a back face thereof, and the first distances and the minimum thicknesses are relatively sized such that the arm member is freely rotatable with respect to the mounting bracket between the closed orientation and the open orientation.

In some embodiments, the mounting bracket is of one-piece construction. In some embodiments, the mounting bracket comprises a front portion that defines the front side and the track portion of the mounting bracket, and a base portion that is coupled to an underside of the mounting bracket that defines the back side of the mounting bracket.

It should be appreciated that all combinations of the foregoing aspects and additional concepts discussed in greater detail below (provided such concepts are not mutually inconsistent) are contemplated as being part of the inventive subject matter disclosed herein.

These and other objects, features and advantages of this disclosure will become apparent from the following detailed description of the various aspects of the disclosure taken in conjunction with the accompanying drawings.

BRIEF DESCRIPTION OF THE DRAWINGS

The accompanying drawings, which are incorporated in and constitute a part of the specification, illustrate embodiments of the disclosure and together with the detailed description herein, serve to explain the principles of the disclosure. It is emphasized that, in accordance with the standard practice in the industry, various features may or may not be drawn to scale. For example, dimensions of various features may be arbitrarily increased or reduced for clarity of discussion. The drawings are presented for purposes of illustrating embodiments of the disclosure and are not to be construed as limiting the disclosure.

DETAILED DESCRIPTION

Figure 1:
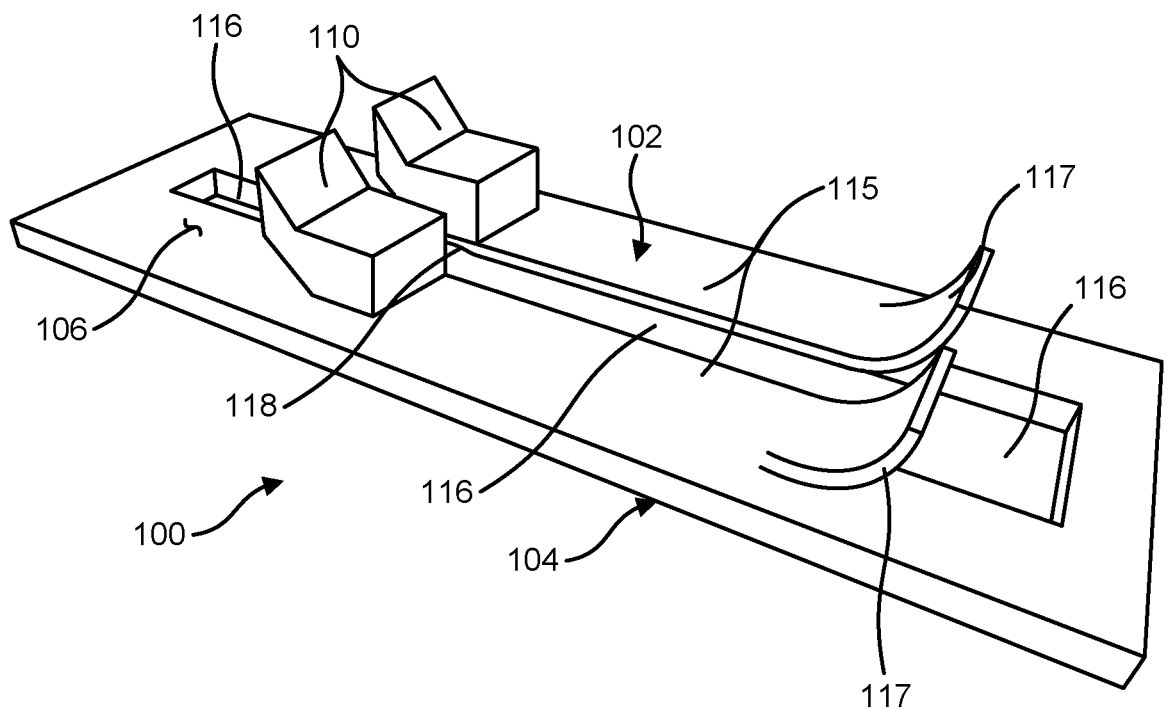
FIG. 1 illustrates an elevational perspective view of an exemplary mounting bracket of an exemplary self-locking hanging device in accordance with an embodiment of the present disclosure.

Aspects of the present disclosure and certain examples, features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the relevant details. It should be understood, however, that the detailed description and the specific examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Approximating language, as used herein throughout disclosure, may be applied to modify any quantitative representation that could permissibly vary without resulting in a change in the basic function to which it is related. Accordingly, a value modified by a term or terms, such as "about" or "substantially," is not limited to the precise value specified. For example, these terms can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. In some instances, the approximating language may correspond to the precision of an instrument for measuring the value.

Terminology used herein is for the purpose of describing particular examples only and is not intended to be limiting. As used herein, the singular forms "a", "an" and "the" are intended to include the plural forms as well, unless the context clearly indicates otherwise. Furthermore, references to one "example" or "embodiment" are not intended to be interpreted as excluding the existence of additional examples that also incorporate the recited features.

Moreover, unless explicitly stated to the contrary, the terms "comprising" (and any form of "comprise," such as "comprises" and "comprising"), "have" (and any form of "have," such as "has" and "having"), "include" (and any form of "include," such as "includes" and "including"), and "contain" (and any form of "contain," such as "contains" and "containing") are used as open-ended linking verbs. As a result, any examples that "comprises," "has," "includes" or "contains" one or more step or element possesses such one or more step or element, but is not limited to possessing only such one or more step or element.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be." The terms "orientation" and "position" as used herein with respect to the physical arrangement between a mounting bracket and an arm member (or the like) are used synonymously.

Components, aspects, features, configurations, arrangements, uses and the like described, illustrated or otherwise disclosed herein with respect to any particular figure or embodiment may similarly be applied to any other figure or embodiment disclosed herein.

The present disclosure provides a self-locking device for hanging objects on a surface, such as a wall or surface that is angled with respect to horizontal (e.g., vertical, nearly vertical or partially vertical). The device may comprise a hanging arm or hook member that slidably mates with an elongated track portion of a mounting bracket. The mounting bracket is configured to removably or fixedly couple to the surface. The arm member is rotatable with respect to the mounting bracket in at least one position along the track portion of the mounting bracket, and is rotatably fixed or locked with respect to the mounting bracket in at least one other position along the track portion. The mounting bracket may be configured to fixedly or removably attach (and/or detach) to a wall or other surface without specialized tools or equipment. The arm member may be configured to fixedly or removably attach (and/or detach) with the track portion of the mounting bracket without specialized tools or equipment.

The arm member is reconfigurable with respect to the mounting bracket from an open position to a closed and locked orientation/position. The open position of the arm member allows a portion of an object to be positioned between an open space between the mounting bracket and the arm member, and be physically supported by at least one of the mounting bracket and the arm member. In the closed and locked position of the arm member, the arm member and the mounting bracket may form an enclosed space that extends about a portion of the object, and the arm member and/or the mounting bracket may physically support the object. In some embodiments, in the closed and locked position of the arm member, the arm member may be selectively locked in the closed position such that the arm member remains in the closed position until the arm member is manually selectively reconfigured into the open position. In some other embodiments, in the closed and locked position of the arm member with a portion of the object positioned within the enclosed space, the arm member may be fixedly locked in the closed position such that the arm member cannot be manually selectively reconfigured into the open position.

The arm member may be slidable along the elongate track portion of the mounting bracket. For example, the track portion of the mounting bracket may define an elongated slot between opposing rail portions, and the arm member may be slidable along the rail portions and within the slot portion. The track portion may be configured to allow the arm member to rotate into the open position when positioned at a first upper portion of the track portion, and orient and lock the arm member in the closed positioned when positioned at other portions (e.g., lower portions) of the track portion.

The self-locking device may be used to hang any object to any mounting surface. For example, without limitation, the self-locking device may hang various different objects, such as framed, pictures, mirrors, canvases, signs, shelves, clocks, plants, sculptures, lighting, tools, etc. to a multiplicity of suitable mounting surfaces including, but not limited to, walls, posts, ceilings, floors, doors, fences, furniture, appliances, etc.

Figure 2:
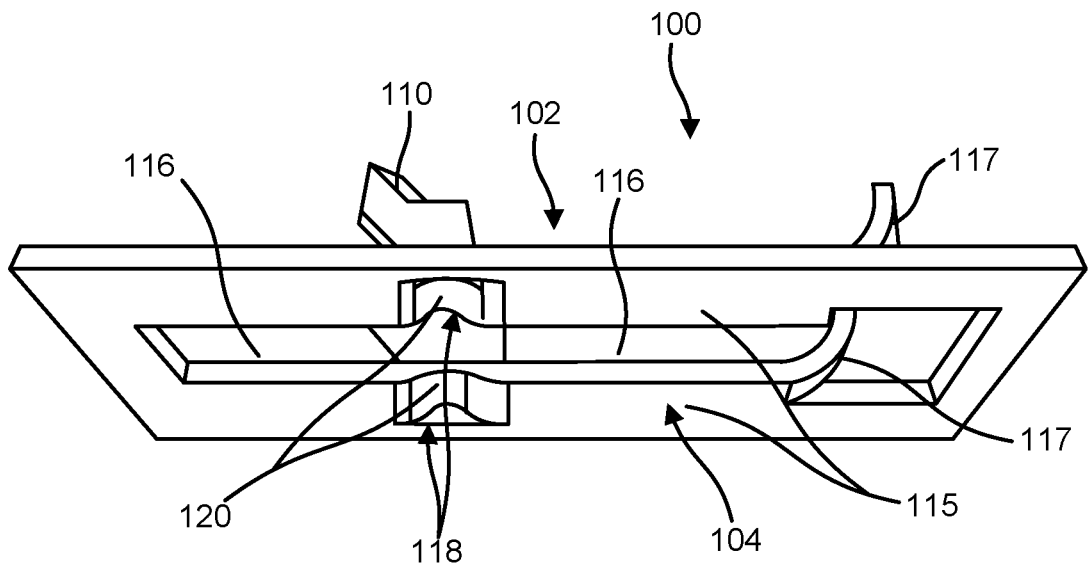
FIG. 2 illustrates a bottom perspective view of the mounting bracket of FIG. 1.

FIGS. 7-12 illustrate an exemplary self-locking device 300 for hanging objects on a wall or other surface according to the present disclosure. FIGS. 1-3 and 7-12 further illustrate an exemplary mounting bracket 100 of the self-locking device 300. As shown in FIGS. 1 and 2, the mounting bracket 100 may include a front side 102 and a rear or back side 104. In use of the self-locking device 300, the rear side 104 of the mounting bracket 100 may face and be coupled to a wall or other mounting surface. The rear side 104 of the mounting bracket 100 may be directly or indirectly coupled to the mounting surface, as described further below. In some embodiments, the mounting surface may extend or be oriented vertically or be angled vertically above horizontal.

As shown in FIG. 1, the front side 102 of the mounting bracket 100 may include at least one hook member or portion 110 that extends outwardly from a front face portion or surface 106. In some embodiments, the mounting bracket 100 may include a pair of hook members 110 extending outwardly from the front face 106, such as being positioned on opposing sides of a track portion of the mounting bracket 100 comprising a pair of guide, track or rail portions 115 and a slot 116 therebetween. The at least one hook member 110 may extend at an angle with respect to the front face 106, such as at an acute angle with respect to a top edge or side of the mounting bracket 100. The at least one hook member 110 may be configured to physically support a portion of an object thereon so that the mounting bracket 100 supports and couples the object to the mounting surface (when the mounting bracket 100 is affixed to the mounting surface). For example, the at least one hook member 110 may be configured to physically support at least one portion and/or hardware of an object (e.g., a hanging wire on the back of a frame or other object) thereon. The at least one hook member 110 may comprise any configuration or types of hooks or other connectors members or hardware that is configured to engage with and physically support a portion of an object, such as a portion of the object itself and/or hanging hardware attached to the object (e.g., eyes or circular rings, D-rings, sawtooth hangers, wires/ropes, nails/screws, hooks, keyholes, clips other hooks, etc.).

In some embodiments, the guide portions 115 of the track portion of the mounting bracket 100 may each include a curved lip end portion 117 at a bottom or lower end of the mounting bracket 100 that is proximate to the bottom or lower end of the mounting bracket 100, as shown in FIG. 1. As shown in FIG. 1, the curved lip end portions 117 of the guide portions 115 may extend away from the front side 102 of the mounting bracket 102 and define free ends. The curved lip end portions 117 may be concave with respect to the front face 106. The curved lip end portions 117 may be arcuate and defined by one or more radii. In some other embodiments (not shown), the end lip end portions 117 may be linear (e.g., an angled flat or planar portion) or rectilinear. In some embodiments, the degree of the angle or curvature of the curved lip end portions 117 may be based on various factors such as, but not limited to, the size of the track portion and the length of the arm member 200. In some embodiments, the degree of the angle or curvature of the curved lip end portions 117 may be within the range of about 30 to about 70 degrees.

Figure 7:
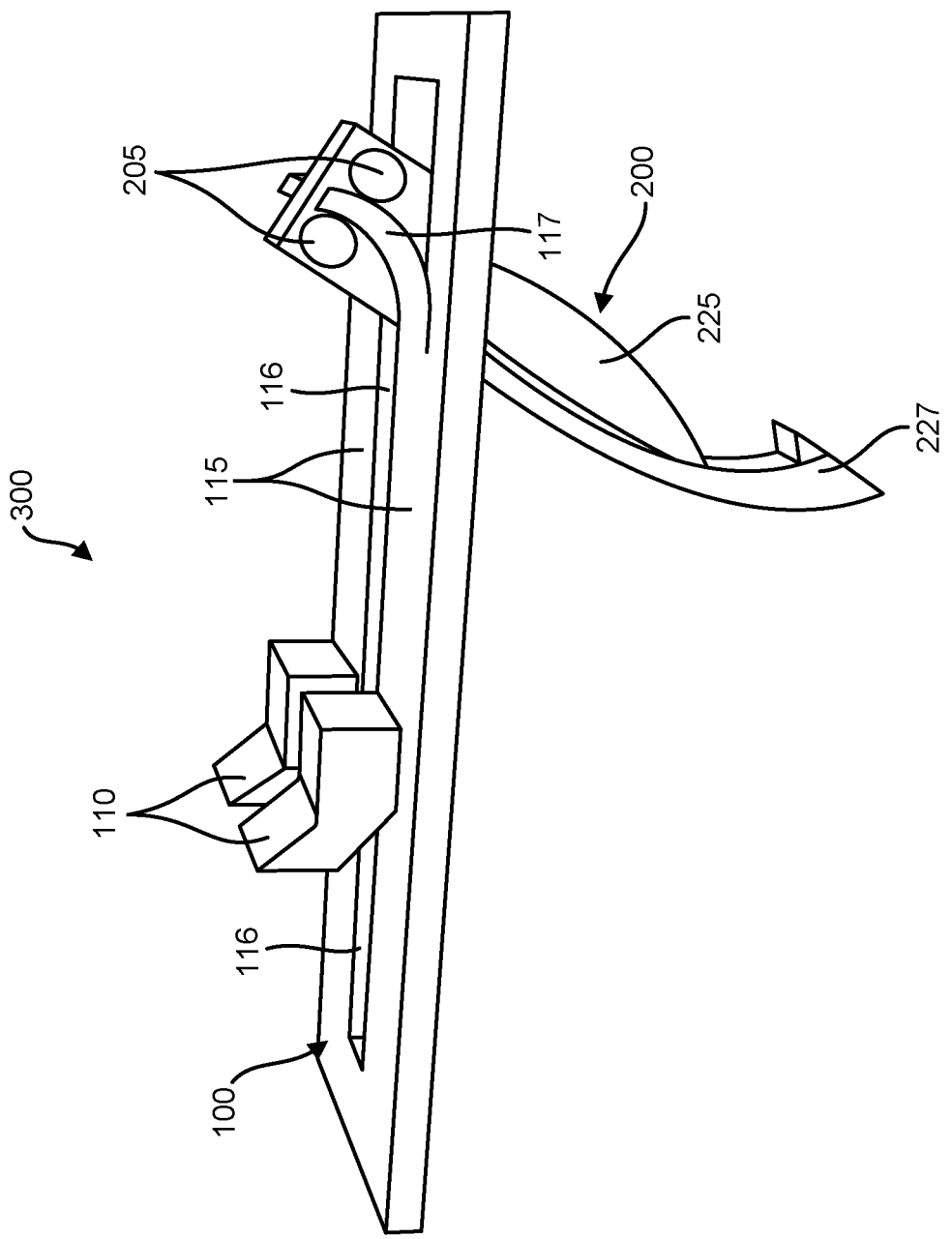
FIG. 7 illustrates a side perspective view of an exemplary self-locking hanging device comprising the locking arm of FIGS. 4-6 being initially engaged with the mounting bracket of FIGS. 1-3 in accordance with an embodiment of the present disclosure.
Figure 12:
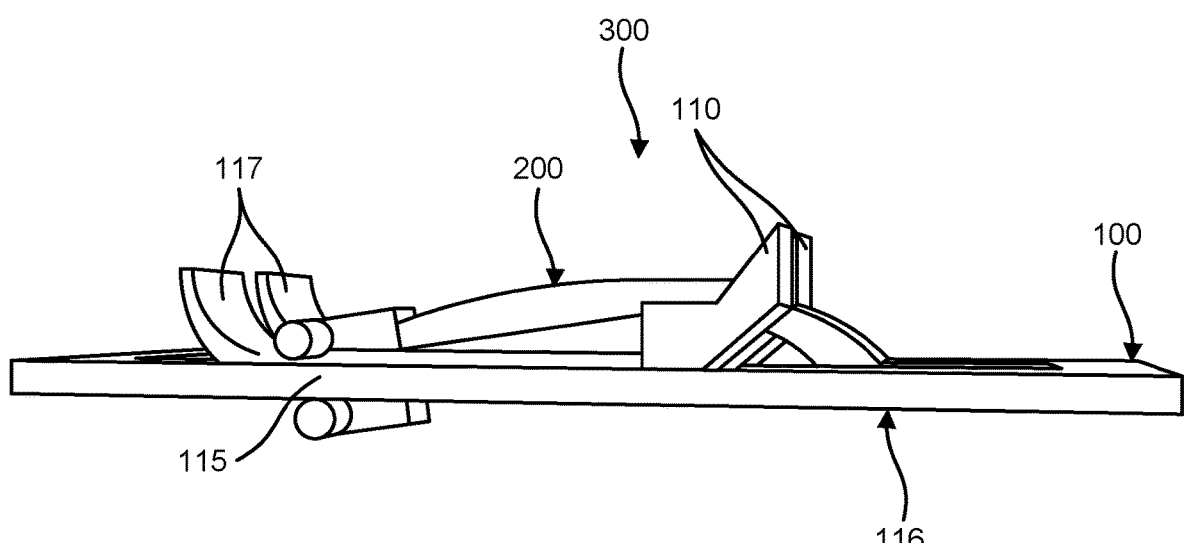
FIG. 12 illustrates a side view of the self-locking hanging device of FIG. 11.

As shown in FIG. 7, the curved lip end portions 117 may be configured to force, direct or orient an arm member 200 of the self-locking device 300 into orientations such that the arm member 200 extends through the slot 116 and past the rear side 104 of the mounting bracket 102 (and potentially past a rear or back side of a base plate 105 coupled to the rear side 104 of the mounting bracket 102, of provided). The curved lip end portions 117 may thereby be configured to direct the arm member 200 past a rear or back side, surface or extent 124 of the self-locking device 300 itself as the arm member 200 slides or translates along or over the curved lip end portions 117. In this way, when the back side 124 of the self-locking device 300 (which may be the back side 104 of the mounting bracket 100 or the back side of the base plate 105 attached thereto, for example) is coupled to and abutting a mounting surface, the arm member 200 is unable to or prevented from sliding/translating fully through or past the curved lip end portions 117 because the mounting surface prevents the arm member 200 from rotating/orienting into the orientation(s) that would allow the arm member 200 pass through/over the curved lip end portions 117 (i.e., the arm member 200 would hot against the mounting surface and prevent proper orientation of the arm member 200 would that would allow the arm member 200 pass through/over the curved lip end portions 117), as shown in FIGS. 1 and 12. The curved lip end portions 117 may thereby act to lock the arm member 200 in a fully closed position when back side 124 of the self-locking device 300 is coupled to and abutting a mounting surface. Further, the curved lip end portions 117 may act to orient the arm member 200 in a fully closed position with a portion of the arm member 200 (e.g., a tip portion 227 and/or projection thereof) positioned within the slot 116 and potentially against the mounting surface (when back side 124 of the self-locking device 300 is coupled to and abutting a mounting surface).

When the back side 124 of the self-locking device 300 is not affixed or abutting the mounting surface (or another surface), the curved lip end portions 117 oriented the arm member 200 such that is extends past the back side 124, and thereby the arm member 200 can freely slide/translate fully through or past the curved lip end portions 117. In some embodiments, the arm member 200 may initially be introduced, assembled or coupled with the track portion of the mounting bracket 100 when the back side 124 of the self-locking device 300 is not affixed or abutting the mounting surface (or another surface), as shown in FIG. 7.

As shown in FIGS. 1-3 and 7-12, the guide portions 115 of the track portion of the mounting bracket 100 may extend from (e.g., may be contiguous with) the curved lip end portions 117. The guide portions 115 may extend upwardly from the curved lip end portions 117. In some embodiments, the guide portions 115 may extend linearly and parallel to each other (and the slot 116 formed therebetween may thereby extend linearly and include parallel sides). In some embodiments, inner surfaces of the guide portions 115 that define the slot or recess 116 therebetween may be flat/linear. For example, the inner surfaces of the guide portions 115 that define the slot or recess 116 therebetween may be planar and extend perpendicularly (and between) the front face 106 and the rear face 104 of the track portion. However, in other embodiments, the inner surfaces of the guide portions 115 may not be planar and/or may not be oriented perpendicular to the front face 106 and/or the rear face 104 of the track portion.

The guide portions 115 may define a thickness between the front face 106 and/or the rear face 104 of the track portion (e.g., measured perpendicularly between the front face 106 and the rear face 104). The guide portions 115 may define a constant thickness along their length (i.e., along the length of the track portion). For example, the front face 106 and/or the rear face 104 of the track portion may be planar and oriented parallel to each other. In some embodiments, each of the pair of guide portions 115 may define the same thickness as each other along the lengths thereof. In some embodiments, the thickness of the guide portions 115 may vary slightly along its length, such as by less than or equal to about a 25% variation, or by less than or equal to about a 10% variation.

As shown in FIGS. 1, 2 and 8-11, an upper portion of the track portion (spaced from the curved lip end portions 117) of the mounting bracket 100 may include rotation portions 118. The rotation portions 118 may be provided at an upper end of the guide portions 115, and may be aligned with each other. The rotation recesses 118 may define upper ends of the guide portions 115. In some other embodiments, the guide portions 115 may extend past the rotation recesses 118.

Figure 10:
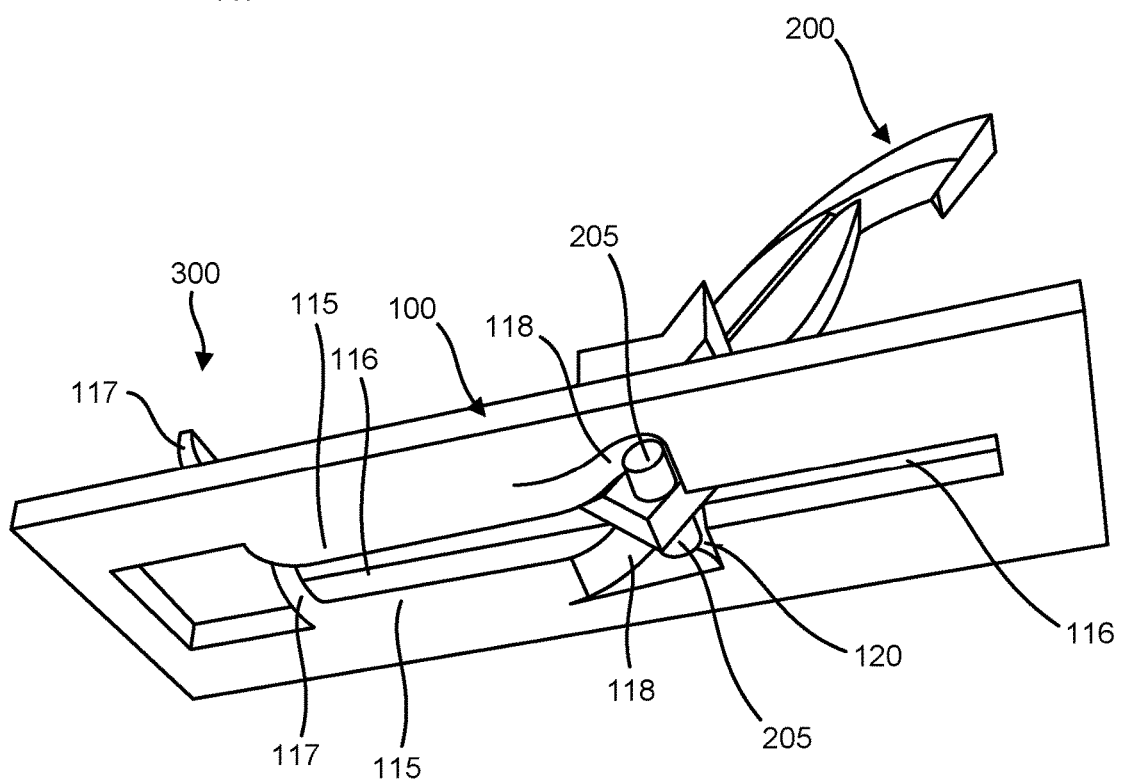
FIG. 10 illustrates a bottom perspective view of the self-locking hanging device of FIG. 9.

The rotation portions 118 may include recesses or indentations in the rear or underside 104 (and/or front face 106) of the track portion. The lower sides of the recesses of the rotation portions 118 in the underside 104 of the track portion may smoothly transition from the underside 104 of the guide portions 115. For example, the recesses of the rotation portions 118 may arcuately extend (e.g., convexly) from the guide portions 115, as shown in FIGS. 1, 2 and 10. The upper sides of the rotation portions 118 opposing the guide portions 115 may transition or extend more sharply to the adjacent portions of the underside 104 than the lower sides of the rotation portions 118.

Figure 8:
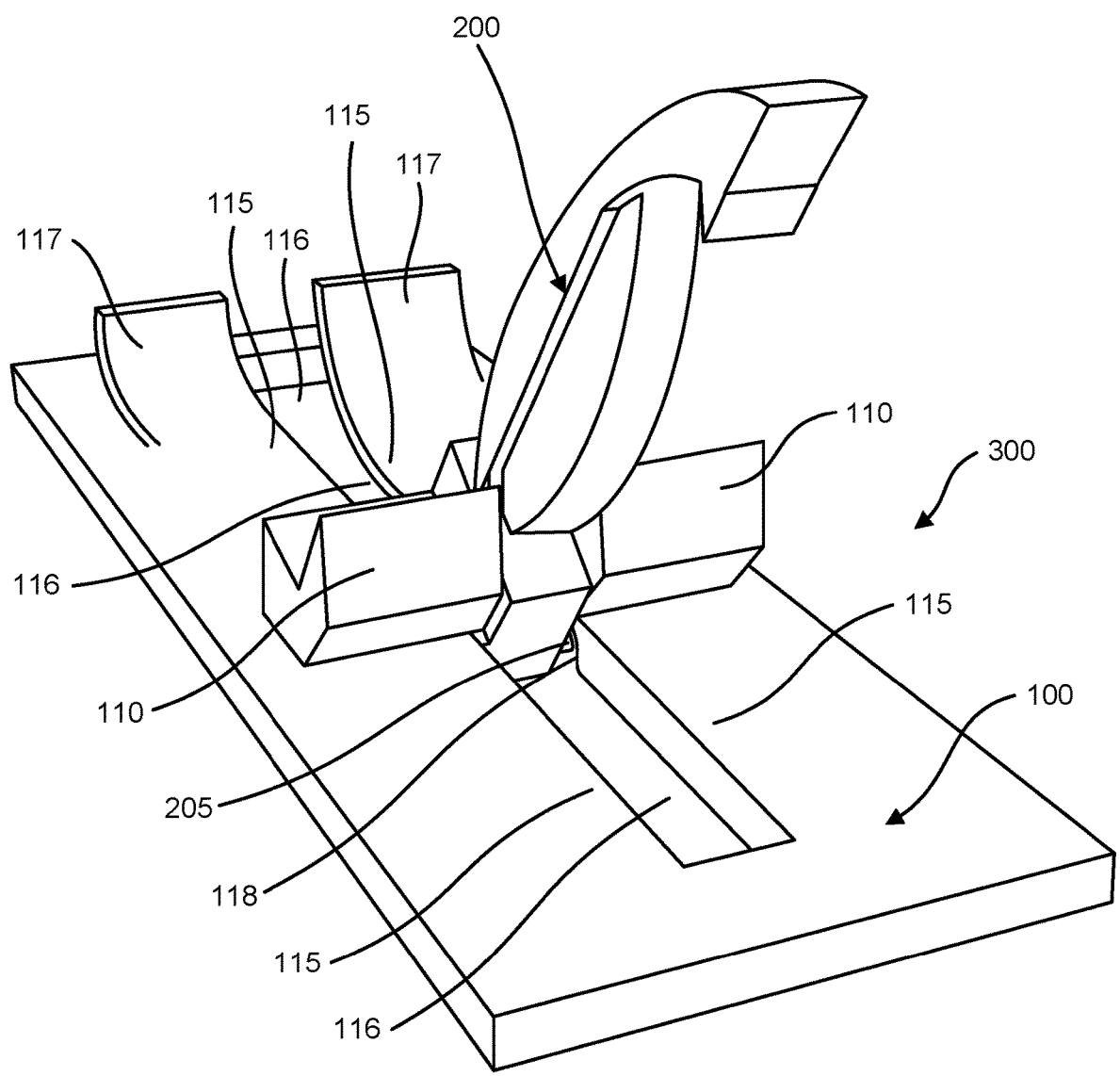
FIG. 8 illustrates a front perspective view of the self-locking hanging device of FIG. 3 with the mounting bracket arranged in an installed and open orientation in accordance with an embodiment of the present disclosure.
Figure 9:
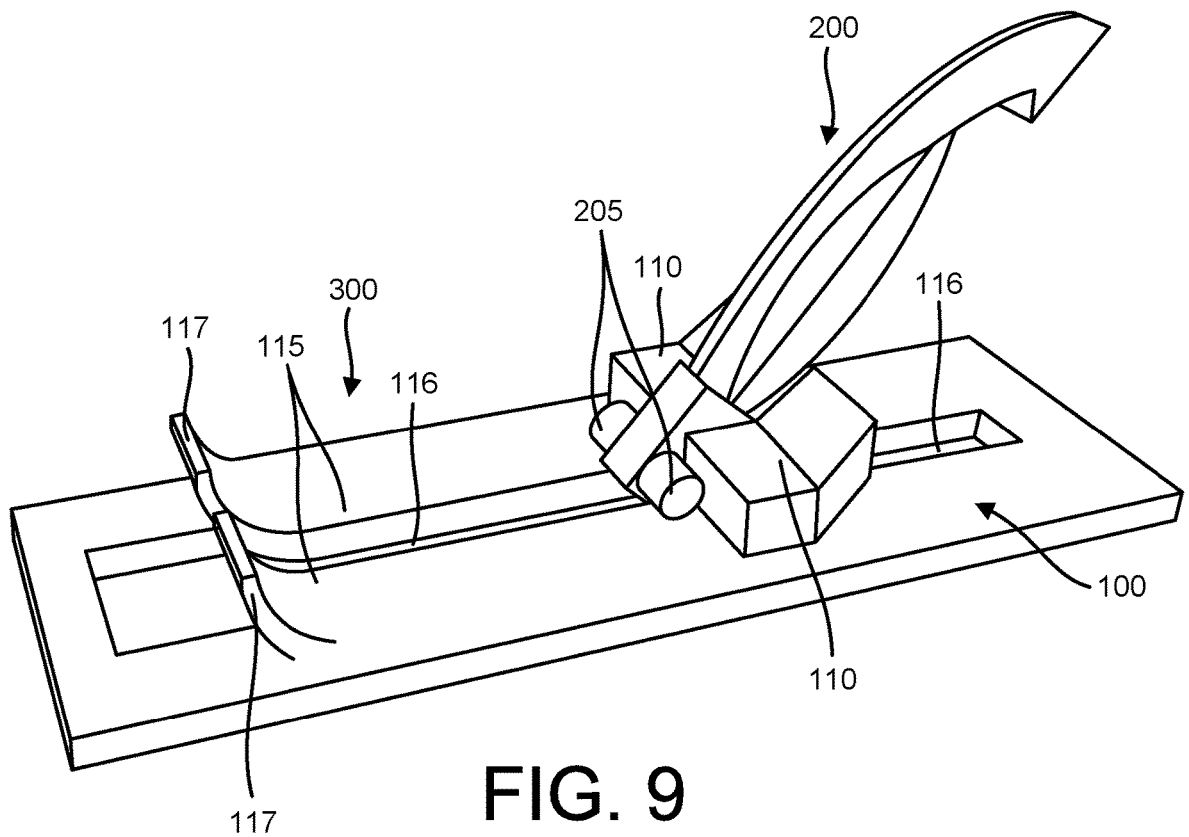
FIG. 9 illustrates a side perspective view of the self-locking hanging device of FIG. 9.

The rotation portions 118 may define a relatively thin portion of the track portion as compared to the thickness of the guide portions 115. In some embodiments, the rotation portions 118 may comprise relatively thin portions of the guide portions 115. As shown in FIGS. 1, 2 and 8-11, the rotation portions 118 may define recesses or indentations in the underside 104 of the track portion such that the thickness between the front face 106 and the "lowest" or "bottom" portion of the underside 104 of the rotation portions 118 is relatively thinner than the thickness of the underside of the guide portions 115 and the front face 106. As explained further below, the relatively thin thickness of the rotation portions 118 of the track portion of the mounting bracket 100 allow the arm member 200 to be able to rotate from the closed portion into the open positioned (with respect to the mounting bracket 100), as shown in FIGS. 8-10. The "lowest" or "bottom" surface of the recesses in the underside 104 of the rotation portions 118 may comprise a convex surface or a planar surface, for example.

As shown in FIGS. 1 and 7-11, the rotation portions 118 may extend at least partially beneath the hook portions 110. For example, the recesses of the rotation portions 118 in the underside 104 of the track portion may be positioned, at least partially, beneath the hook portions, as shown in FIGS. 1 and 7-11. In some embodiments, the portions of the front face 106 comprising the guide portions 115 and the rotation portions 118 may be flat or planar. However, in other embodiments the rotation portions 118 may be positioned past the hook portions 110 such that the hook portions 110 are positioned between the rotation portions 118 and the curved lip end portions 117 (see, e.g., FIGS. 17-19, or the mounting bracket 100 may be void of the hook portions 110 (see, e.g., FIGS. 13, 15 and 16). In such embodiments, the rotation portions 118 may comprise portions of the front face 106 of the mounting bracket 100 (which may be planar and contiguous and parallel with planar portions of the front face 106 of the guide portions 115) and the recessed underside 104 portion of the track portion of the mounting bracket 100

(i.e., recessed with respect to at least the underside 104 portion of the guide portions 115 of the mounting bracket 100.

Figure 3:
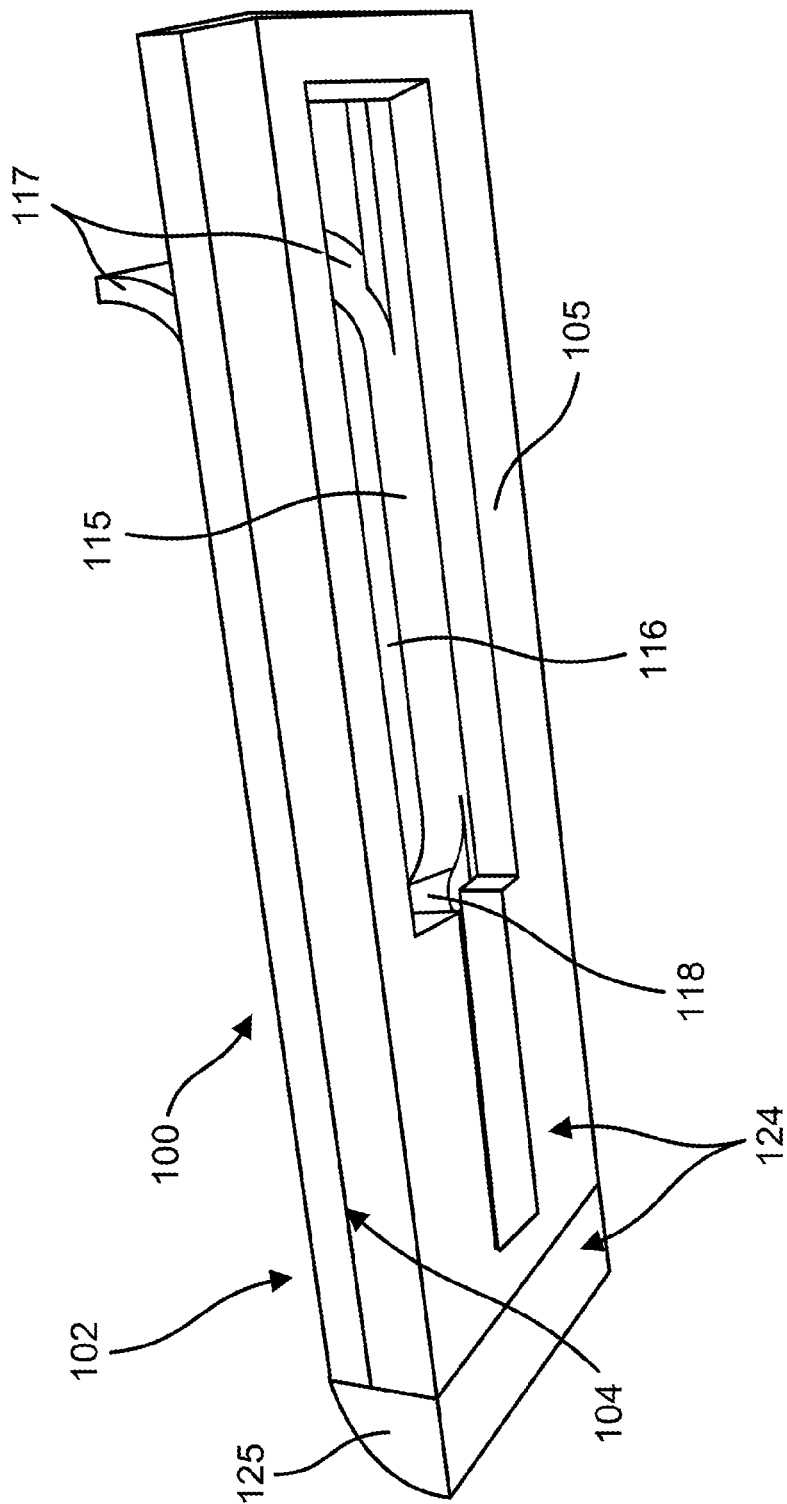
FIG. 3 illustrates a bottom perspective view of the mounting bracket of FIG. 1 in engagement with an exemplary base portion in accordance with an embodiment of the present disclosure.

As shown in FIG. 3, in some embodiments, the back side 124 of the self-locking device 300 may be defined by a base portion 105 and/or a cap portion 125 that are coupled to the mounting plate 100. As shown in FIG. 3, the base portion 105 may be coupled to the back side 104 of the mounting plate 100. The base portion 105 may include an aperture or recess that aligns with the track portion of the mounting plate 100 so that the base portion 105 does not interfere with the interaction of the arm member 200 and the track portion (i.e., the translation and rotation of the arm member 200 along/on the track portion). In this way, the underside 104 of the track portion may be exposed, as shown in FIG. 3. Further, the base portion 105 may act to space the mounting plate 100 away from the mounting surface. For example, the back side of the base portion 105 may define the back side 124 of the self-locking device 300 that is coupled with an abuts the mounting surface. The base portion 105 may thereby space the underside 104 of the track portion of the mounting bracket 100 from the mounting surface when the self-locking device 300 is affixed thereto. The base portion 105 may thereby prevent the mounting surface from interfering with the interaction of the arm member 200 and the track portion (i.e., the translation and rotation of the arm member 200 along/on the track portion).

As also shown in FIG. 3, the self-locking device 300 may include the cap portion 125 coupled to the uppermost or top side/end of the mounting bracket 100 (and potentially the base plate 105). In some embodiments, the underside of the cap portion 125 may define a portion of the back side 124 of the self-locking device 300. The cap portion 125 may define the upper-most profile of the mounting bracket 100 (and/or base plate 105). The cap portion 125 may be configured to substantially inhibit wires or other hanging means from catching on the top end of the mounting bracket 100 (and/or base plate 105). As shown ion FIG. 3, the cap portion 125 may include an outer cap surface that extends from the back side 124 to the front face 106 of the front side 102 of the mounting bracket 100. In some embodiments, the outer cap surface of the cap portion 125 may be arcuate, such as arcuately convex, as shown in FIG. 3. In some other embodiments, the outer cap surface of the cap portion 125 may be plana/linear or rectilinear.

Although the base portion 105 and the cap portion 125 are shown in FIG. 3 as separate and distinct components that are coupled (e.g., fixedly coupled) to the mounting bracket 100, the mounting bracket 100 and the base portion 105 may be integral and/or the mounting bracket 100 and the cap portion 125 may be integral (see, for example, FIGS. 15-19). As such, the mounting bracket 100 of the self-locking device 300 may be integral or of one-piece construction (e.g., monolithic). In some such embodiments, the base portion 105 may be an integral portion of the mounting bracket 100 that form the backside 124 thereof and spaces the track portion from the mounting surface.

The mounting bracket 100 (and/or the base portion 105 and/or the cap portion 125) may be comprised of any material, such as, but not limited to, one or more plastic or polymer, metal, wood, ceramic, glass, composite material or a combination thereof. The mounting bracket 100 (and/or the base portion 105 and/or the cap portion 125) may be formed or manufactured via any appropriate process or processes, such as, but not limited to, molding (e.g., injection molding), machining, casting, forging, forming, 3D printing or another additive manufacturing process or a combination thereof.

Figure 4:
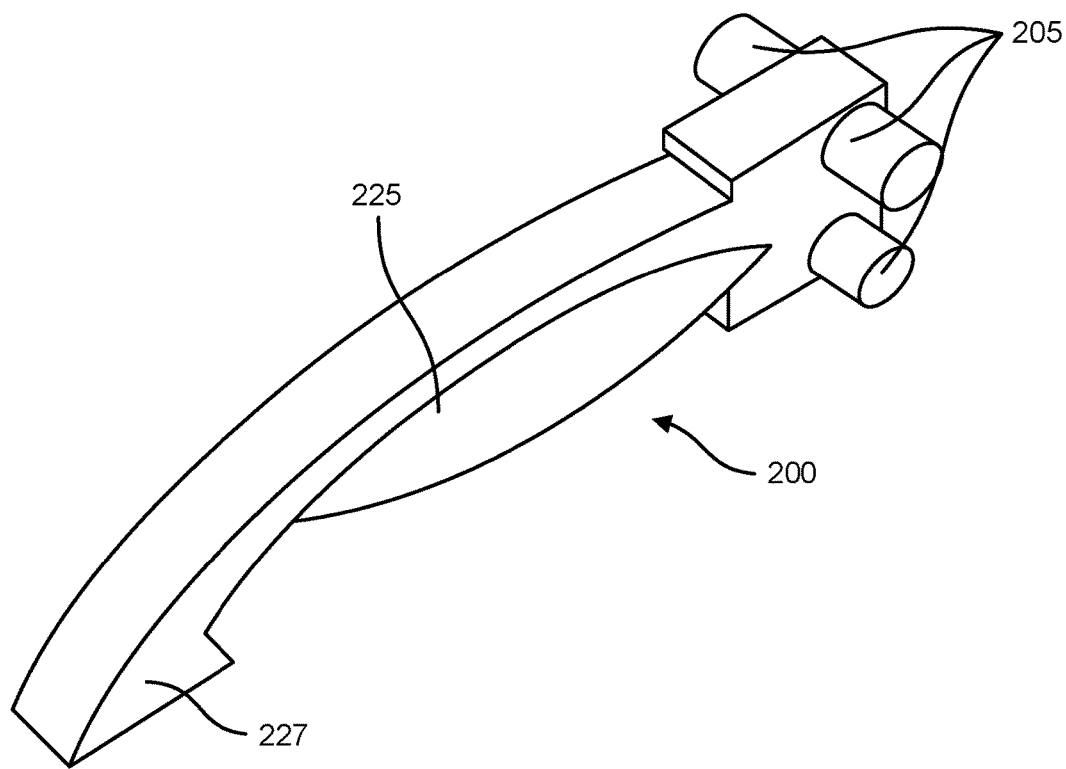
FIG. 4 illustrates an elevational perspective view of an exemplary locking arm of the self-locking hanging device for engagement with the mounting bracket of FIGS. 1-3 in accordance with an embodiment of the present disclosure.
Figure 5:
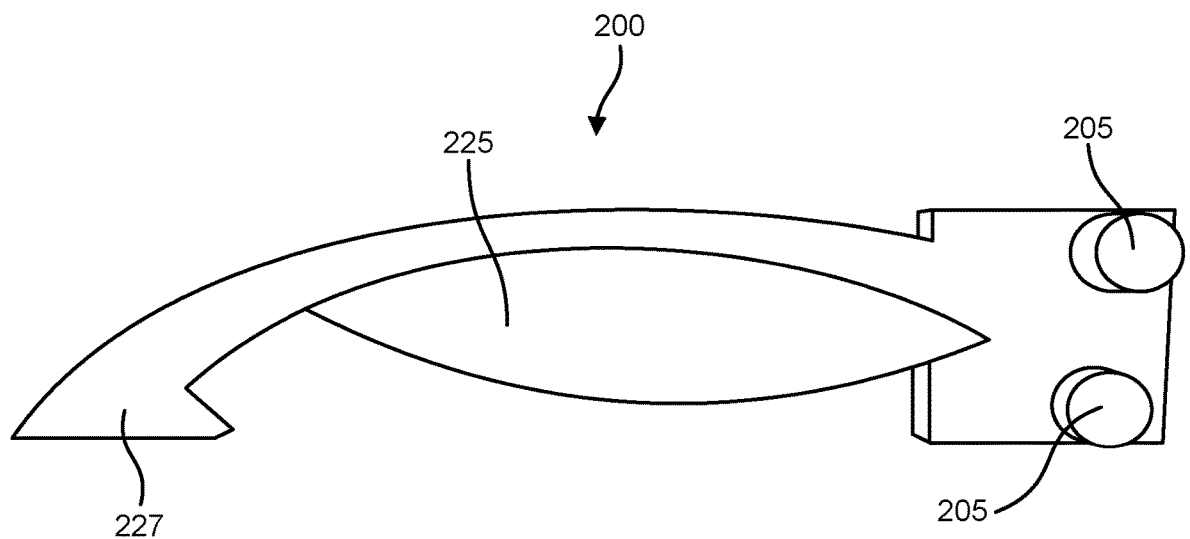
FIG. 5 illustrates a side view of the locking arm of FIG. 4.
Figure 6:
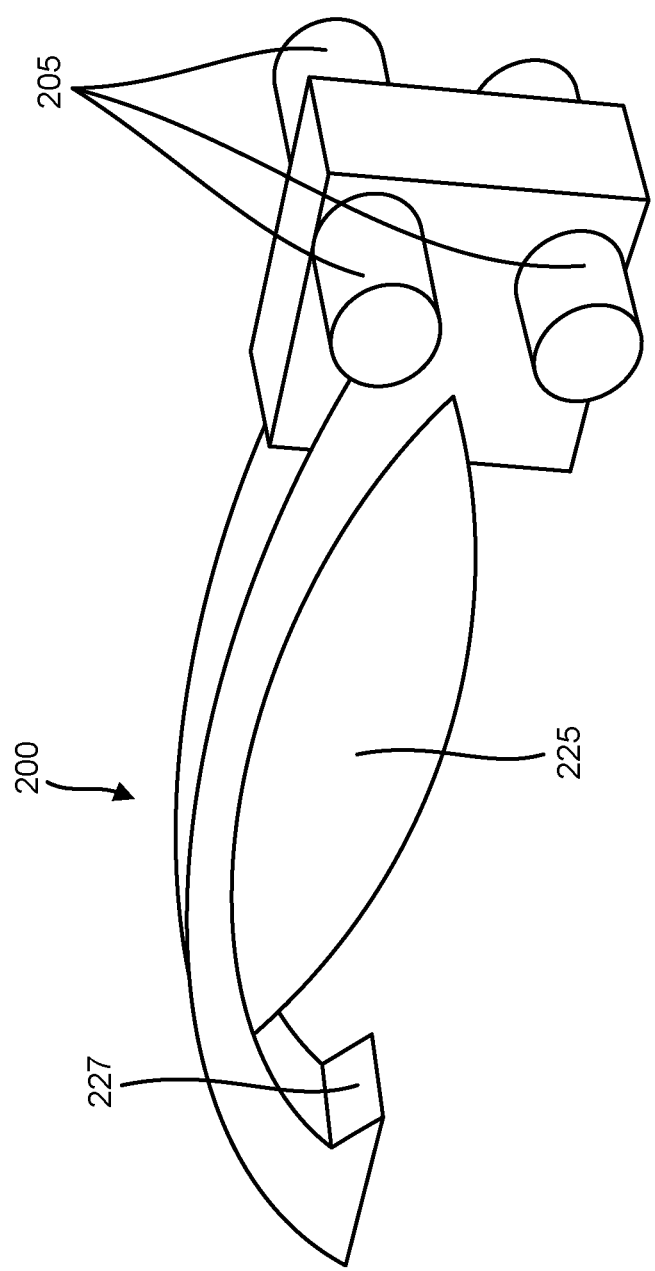
FIG. 6 illustrates a rear perspective view of the of FIG. 4.

FIGS. 4-6 illustrate an exemplary locking arm member or mechanism 200 of the self-locking device 300. As shown in FIGS. 4-6, the arm member 200 includes at least two pairs of posts or projections 205 extending laterally from differing sides (e.g., opposing or opposite sides) of an end pivot portion of the arm member 200. The end pivot portion of the arm member 200 may be configured to be positioned within, and translate and rotate within, the slot 116 of the track portion.

The pairs of posts 205 may each include an upper post and a lower post. The upper posts of the pairs of posts 205 may be aligned with each other, and the lower posts of the pairs of posts 205 may be aligned with each other. Each pair of posts 205 may define a minimum spacing or distance therebetween. The space between the posts 205 of each pair of posts 205 may be slightly greater than (e.g., less than or equal 5% larger, less than or equal 10% larger or less than or equal 25% larger) the maximum thickness of the track portion of the mounting bracket 100. For example, the space between the posts 205 of each pair of posts 205 may be slightly larger than the maximum thickness of the guide portions 115 of the track portion, which may be thicker or the same thickness as the curved lip end portions 117 and thicker than the thickness of the rotation portions 118.

The pairs of posts 205 may thereby be configured to engage and translate along, and potentially rotated on, the track portion of the mounting bracket 100, as shown in FIGS. 7-12. As shown in FIGS. 7-12, the upper posts of the pairs of posts 205 may engage (extend over) and ride on front face 106 of the track portion and the lower posts of the pairs of posts 205 may engage (extend over) and ride on the underside 104 of the track portion. As shown in FIG. 7, the thickness of the curved lip end portions 117 relative to the minimum space between the pairs of posts 205 (and the orientation of the curved lip end portions 117) forces the arm member 200 into a locking closed position with respect to the mounting bracket 100 when the curved lip end portions 117 are positioned between the pairs of posts 205. Specifically, as shown in FIG. 7, the curved lip end portions 117 and the pairs of posts 205 may be configured (e.g., the clearance therebetween) such that the arm member 200 is angled or oriented into a position such that it extends through the slot 116 and past the back side 124 of the mounting bracket 100 when the pairs pf posts 205 are positioned in at least one location along the curved lip end portions 117 (i.e., when the pairs of posts 205 are mounted on the curved lip end portions 117 in the at least one location). The arm member 200 may thereby be installed on or removed from the curved lip end portions 117 while the mounting bracket 100 is removed from the mounting surface.

Figure 11:
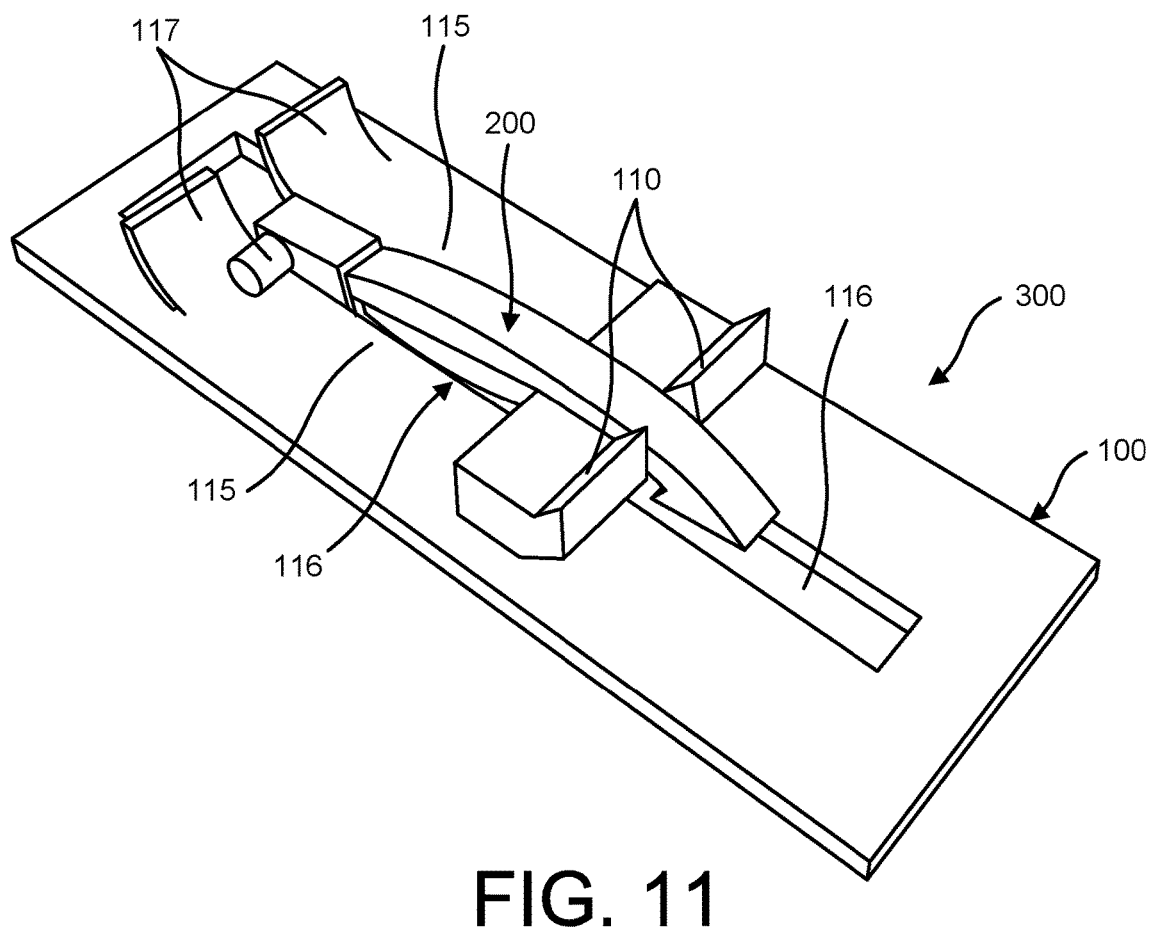
FIG. 11 illustrates an elevational perspective view of the self-locking hanging device of FIG. 7 with the mounting bracket arranged in a closed and locked orientation in accordance with an embodiment of the present disclosure.

As shown in FIGS. 11 and 12, the curved lip end portions 117 and the pairs of posts 205 may be configured (e.g., the clearance therebetween) such that the arm member 200 can be translated along the curved lip end portions 117 from the locking fully closed position to a closed position proximate to (or mounted on) the guide portions 115. The curved lip end portions 117 and the pairs of posts 205 may be configured (e.g., the shape of the curved lip end portions 117 and the clearance therebetween) such that at least when the arm member 200 is positioned proximate to (or mounted on) the guide portions 115, the arm member 200 is re-oriented such that it no longer extends past the back side 124 of the mounting bracket 100, as shown in FIGS. 11 and 12. Rather, as shown in FIGS. 11 and 12, the tip of the arm member 200 may be re-positioned above the back side 124 of the mounting bracket 100, such as within the slot 116, even with the front face 106 or above the front face 106.

The pairs of posts 205 of the arm member 200 and the guide portions 115 may be configured (e.g., the thickness of the curved lip end portions 117 relative to the minimum space between the pairs of posts 205 may be configured) to orient/force the arm member 200 into a closed position such that it is positioned above the back side 124 of the mounting bracket 100 and at least partially below the hook members 110 (if provided) and/or within the slot 116. The pairs of posts 205 and the guide portions 115 may thereby be configured to allow the pairs of posts 205, and thereby the arm member 200 as a whole, to translate along the length of the guide portions 115 when the back side 124 is positioned against a mounting surface. The pairs of posts 205 and the guide portions 115 may also be configured (e.g., the relative space therebetween) to prevent the arm member 200 from rotating with respect to the mounting bracket 100 out of the closed positioned, and potentially into an open position with the mounting bracket 100 (e.g., a tip, hook or other portion thereof) positioned away (i.e., spaced) from the front face 106 of the track portion of the mounting bracket 100. In the closed positioned or orientation, at least a portion of the arm member 200 may be positioned above the front face 106 of the mounting bracket 100 (e.g., at least the front face 104 of the track portion) and/or at least a portion of the hook portions 110 (if provided), as shown in FIG. 12.

The guide portions 115 (and potentially a portion of the curved lip end portions 117 extending from or positioned proximate to the guide portions 115) and the arm member 200 may be configured such that the arm member 200 is oriented/positioned in the closed orientation/position such that the tip portion 227 is positioned proximate to the front side 102 (e.g., the front face 106 thereof) of the mounting bracket 100. For example, as shown in FIGS. 11 and 12, in the closed position/orientation of the arm member 200, at least a portion of the arm member 200 may be positioned within the slot 116 (e.g., the arm member 200 may extend only partially through the slot 116). In some such embodiments, in the closed position/orientation of the arm member 200, a tip or end portion of the arm member 200 may be positioned within the slot 116 (i.e., positioned between the front face 106 of the mounting bracket 100 and the back side 104/124 of the mounting bracket 100 within the slot 116). In some other embodiments, in the closed position/orientation of the arm member 200, a tip or end portion of the arm member 200 may be positioned above/even with the slot 116 and/or even with the front side 102 (e.g., the front face 106 thereof) of the mounting bracket 100. In some other embodiments, in the closed position/orientation of the arm member 200, an underside of a tip portion 227 of the arm member 200 may be spaced from the front side 102 and/or front face 106 of the mounting bracket 100. The arm member 200 may thereby be angled with respect to the front side 102 and/or front face 106 of the mounting bracket 100. In some such embodiments, in the closed position/orientation of the arm member 200, the tip or end portion may be spaced above the front side 102 and/or front face 106 of the mounting bracket 100 by less than or equal to about 15 degrees (e.g., measured between the underside of the tip portion 227 of the arm member 200 and the front face 106 from the projections 205 engaging the front face of the track portion with respect to a top side of the mounting bracket 100).

In some embodiments, in the closed position/orientation of the arm member 200, the tip or end portion may be spaced above the front side 102 and/or front face 106 of the mounting bracket 100 within the range of about 15 degrees and about 5 degrees (e.g., measured between the underside of the tip portion 227 of the arm member 200 and the front face 106 from the projections 205 engaging the front face of the track portion with respect to a top side of the mounting bracket 100). In some embodiments, in the closed position/orientation of the arm member 200, the tip or end portion may be spaced above the front side 102 and/or front face 106 of the mounting bracket 100 less than or equal to about 10 degrees, or about 5 degrees (e.g., measured between the underside of the tip portion 227 of the arm member 200 and the front face 106 from the projections 205 engaging the front face of the track portion with respect to a top side of the mounting bracket 100). In some embodiments, in the closed position/orientation of the arm member 200, the tip or end portion may be spaced above the front side 102 and/or front face 106 of the mounting bracket 100 less than about 10%, or less than about 5%, of the spacing thereof in the open position/orientation of the arm member 200 (e.g., measured between the underside of the tip portion 227 of the arm member 200 and the front face 106 from the projections 205 engaging the front face of the track portion with respect to a top side of the mounting bracket 100).

In the closed position, the arm member 200 may form an enclosed space or gap positioned above the front face 106 of the mounting bracket 100 (e.g., at least the front face 104 of the track portion) and/or at least a portion of the hook portions 110 (if provided) and beneath the arm member 200, as shown in FIG. 12. Such a gap or space may allow a portion of an object to pass therethrough and be trapped between the arm member 200 and the front face 106 of the mounting bracket 100 (e.g., at least the front face 104 of the track portion) and/or at least a portion of the hook portions 110 (if provided).

As shown in FIGS. 8-10, the arm member 200 may be translated along the guide members 115 of the track portion in the closed positioned until the pair of posts 205 engage the rotation portions 118. Specifically, the arm member 200 may be translated such that the lower posts of the pair of posts 205 are seated within the recesses within the underside 104 of the track portion. The pair of posts 205 and the rotation portions 118 may be configured such that the arm member 200 is forced to rotate into an open position, or is able to be rotated into the open position, such that at least a tip portion of the arm member 200 is positioned in a spaced relationship from the front face 104 (and potentially the mounting hook portions 110) of the mounting bracket 100, as shown in FIGS. 8-10. For example, the thickness of the rotation portions 118 relative to the minimum space between the pairs of posts 205 (and the orientation of the rotation portions 118) may force the arm member 200 into the open position. Alternatively, the thickness of the rotation portions 118 relative to the minimum space between the pairs of posts 205 may provide a gap therebetween that allows the arm member 200 to be rotated or repositioned (e.g., manually) along a range or orientations that includes degrees of the open position (i.e., a range of positions/orientations with at least a tip portion of the arm member 200 being spaced from the front face 104 (and potentially the mounting hook portions 110) of the mounting bracket 100, as shown in FIGS. 8-10. Each recess of the rotation portion 180 may comprise a lip or rear stop end surface to aid in holding at least the lower posts 205 in the recesses when the locking arm is in the open position. The rear stop end surfaces of the rotation recesses of the rotation portions 180 may be distal to a respective guide portion 115 and be configured to engage with and retain one of the lower projections 205 and retain the arm member 200 in the open orientation. In some embodiments, the recesses and any post retention means such as, but not limited to, lips or back stops could be altered for example, without limitation, in depth, curve, angle, etc. based on the type and configuration of the arm member 200. In some embodiment, the rotation portions 180 may be implemented without retention means for the recesses thereof.

As shown in FIGS. 4-6, the arm member 200 may include a hooked tip portion 227. The hooked tip 227 of the arm member 200 may engage with hanging hardware on the object being hung. The hooked tip 227 of the arm member 200 may form a projection that extends outwardly toward the front side 102 of the mounting bracket 100 in the closed position and/or toward the base portion of the arm member 200. A projection portion 215 (e.g., arcuately convex projection) on the underside (potentially near the center of arm member 200) of the arm member 200 may act to ensure that the hanging hardware or other portion of the object being hung is seated correctly onto the hook members 110 of the mounting bracket 100 and/or may substantially inhibit the object from disengaging the hook members 110. The arm member 200 may take a generally convex shape (e.g., arcuately convex shape) with respect to the front or outwardly-facing side of the device 300. In some embodiments, the underside of the arm member 200 may include at least one projection or recess.

The mounting bracket 100 (and the device 300 as a whole) may be coupled to a mounting surface with the arm member 200 mounted on the guide portions 115 (in the closed position) or with the arm member 200 mounted on the rotation portions 118 (in the open or closed positions). Those skilled in the art will readily recognize, in light of and in accordance with the teachings of the present disclosure, that a multiplicity of suitable means may be used to mount the mounting bracket 100 of the self-locking device 300 to a mounting surface including, without limitation, adhesive strips, nails, screws, glue, hook and loop material, magnets (for metal surfaces), brackets, suction cups, mortice and tenon joint, other carpentry joints, etc.

In the open position of the arm member 200, as shown in FIGS. 8-10, a portion of an object may be positioned between the front face 106 of the front side 102 of the mounting bracket 100 and the arm member 200, and potentially on upper sides of the hook portions 110. The arm member 200 may then be rotated on/in the mounting portions 118 into the closed position and translated downwardly onto and along the guide member 115 to trap or contain the portion of the object between the arm member 200 and the front face 106 of the mounting bracket 100 (e.g., at least the front face 104 of the track portion) and/or at least a portion of the hook portions 110 (if provided), as shown in FIGS. 11 and 12. When moved into the closed position, the arm member 200 may serve as a guide to direct the object onto the hook portions 110 (if present). For example, the curved portion 225 and/or the hooked tip 227 of the arm member 200 may aid in guiding the object onto the hook portions 110 (if present).

In the open orientation/position of the arm member 200, as shown in FIGS. 8-10, the tip portion 227 may be positioned distal to the front side 102 and front face 106 of the mounting bracket 100 as compared to it in the closed orientation/position. Stated differently, in the open orientation/position of the arm member 200, the tip portion 227 may be spaced from the front side 102 and front face 106 of the mounting bracket 100 to a greater extent than as compared to it in the closed orientation/position, as shown in FIGS. 8-12.

The arm member 200 may thereby be angled with respect to the front side 102 and/or front face 106 of the mounting bracket 100 when in the open orientation/position, as shown in FIGS. 8-10. In some embodiments, in the open position/orientation of the arm member 200, the tip or end portion may be spaced above the front side 102 and/or front face 106 of the mounting bracket 100 by less than or equal to 120 degrees, less than or equal to 100 degrees, less than or equal to 90 degrees, less than or equal to 75 degrees, less than or equal to 45 degrees or less than or equal to 30 (e.g., measured between the underside of the tip portion 227 of the arm member 200 and the front face 106 from the projections 205 engaging the front face of the track portion with respect to a top side of the mounting bracket 100). In some embodiments, in the open position/orientation of the arm member 200, the tip or end portion may be spaced above the front side 102 and/or front face 106 of the mounting bracket 100 within the range of about 120 degrees and about 10 degrees, within the range of about 120 degrees and about 30 degrees, within the range of about 90 degrees and about 30 degrees, or within the range of about 60 degrees and about 30 degrees (e.g., measured between the underside of the tip portion 227 of the arm member 200 and the front face 106 from the projections 205 engaging the front face of the track portion with respect to a top side of the mounting bracket 100).

As also shown in FIGS. 11 and 12, the arm member 200 may be translated downwardly along the guide portions 115 to the curved lip end portions 117. As explained above, the curved lip end portions 117 may be configured to force the arm member 200 into an orientation such that the tip of the arm member 200 extends into and through the slot 116 and to/past the backside 124 of the mounting bracket 100. As the backside 124 of the mounting bracket 100 is affixed to the mounting surface, the curved lip end portions 117 act to reorient or rotate the arm member 200 into an orientation such that the tip of the arm member 200 extends into and through the slot 116 and into abutment with the backside 124 of the mounting bracket 100. In this way, when a portion of the object extends between the arm member 200 and the front face 106 of the mounting bracket 100 (e.g., at least the front face 104 of the track portion) and/or at least a portion of the hook portions 110 (if provided), the guide portions 115 and the curved lip end portions 117 prevent the arm member 200 from rotating to the open position, and the curved lip end portions 117 act to close the position of the arm member 200, to lock the arm member 200 in the closed position. The curved lip end portions 117 also thereby prevent the arm member 300 from translating off the track portion (i.e., over and past the curved lip end portions 117 themselves).

The following example describes how the self-locking device 300 may be used to hang an object with a hanging wire on a mounting surface. First, the arm member 200 may be mounted on the track portion of the mounting bracket 100 by engaging the pairs of posts 205 with the curved lip end portions 117, as shown in FIG. 7. Specifically, the arm member 200 and the mounting bracket may be relatively oriented and positioned such that the curved lip end portions 117 extend between the pairs of posts 205 of the arm member 200. The arm member 200 may then be slid along the curved lip end portions 117, and thereby rotated to the closed position, to the guide portions 115, as shown in FIGS. 11 and 12. The arm member 200 may then be slid along the guide portions 115 in the closed position to the rotation portions 118, as shown in FIGS. 8-10. The rotation portions 118 may then allow the arm member 200 to be rotated into the open position to accept the hanging wire between the arm member 200 and the mounting bracket 100, as shown in FIGS. 8-10. The mounting bracket 100 may be affixed to the mounting surface with the arm member 200 engaged with the guide portions 115 in the closed position or the arm member 200 engaged with the rotation portions 118 in the closed or open positions.

With the mounting bracket 100 affixed to the mounting surface, and the arm member 200 engaged with the rotation portions 118 and oriented in the open position, the hanging wire may then be loaded onto the arm member 200 and/or the hook portions 110. Once the self-locking device 300 is engaged by the mounting wire, the arm member 200 may guide the wire into a groove or holding portion created by the hook portions 110 on the mounting bracket 100 by rotating into the closed position. The arm member 200 may then be allowed to slide down, or manually slid down, the guide portions 115 in the closed position, such as to engage the hanging wire with the hooked tip portion 227 to hold the wire securely on the hook portions 110 and thereby locking the object onto the mounting bracket 100. The pairs of posts 205 may prevent the arm member 200 from rotating from the closed position to the open position, and thereby lock the hanging wire to the device 200, as discussed above.

The arm member 200 may slide downwardly so that the pairs of posts 205 engage the curved lip end portions 117. As described above, the curved lip end portions 117 may act to force or rotate the arm member 300 toward the backside 124 of the mounting bracket 100, thereby further locking the arm member 300 in the closed position. The curved lip end portions 117 may thereby may substantially inhibit the installation or removal of the arm member 200 when mounting bracket 100 is mounted to the mounting surface. Moreover, with arm member 200 locked in the closed position, the mounting wire cannot be pulled away from the mounting surface or the mounting bracket 100 due to the engagement of the posts 205 on the guide portions 115 and/or the rotation portions 118. If desired, to remove the object from the mounting surface, the object may be removed by lifting the object upwardly. Forcing the object upwardly may pull the arm member 200 up along the guide portions 115 and to/into rotation portions 118 to allow the arm member 200 to rotate into the open position, thereby allowing the hanging wire to be removed from between the mounting bracket 200 and the arm member 200.

Those of ordinary skill in the art will readily recognize, in light of and in accordance with the teachings of the present disclosure, that some device embodiments may comprise alternatively designed mounting brackets 100, hook members 110 and/or arm members 200 than those depicted in FIGS. 1-12 to allow or suit particular objects. For example, without limitation, some embodiments may be implemented with thinner arm members 200 and/or differently shaped hook members 110 on the mounting bracket 100 than those depicted in FIGS. 1-12, such as to hang object without hanging wires for example. As another example, some embodiments may be specifically configured to hang keys, to mount televisions or other heavy objects, to hang curtains, mount a kayak, hold bags, potted plants, wires, etc.

Figure 13:
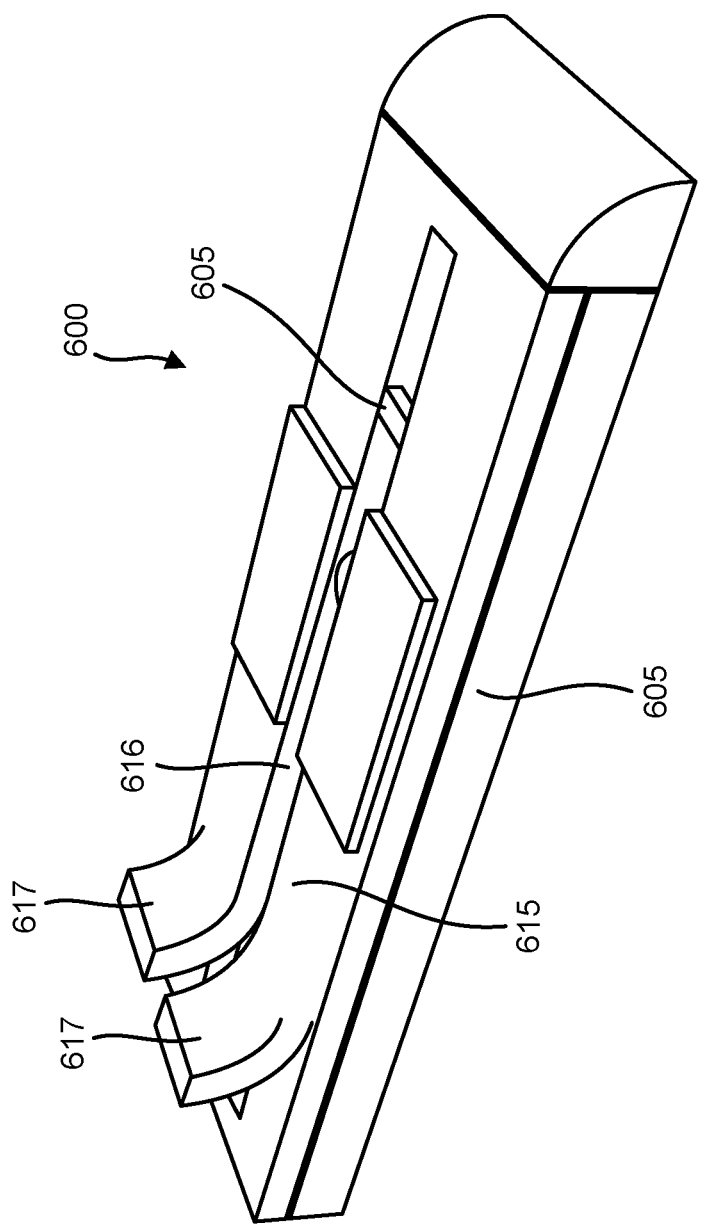
FIG. 13 illustrates an elevational perspective view of another exemplary mounting bracket in accordance with an embodiment of the present disclosure.

An exemplary embodiment of a mounting bracket for a self-locking device for hanging objects on a mounting surface according to the present disclosure is shown in FIG. 13 and generally indicated with the reference numeral 600. Some aspects, elements and/or functions of exemplary mounting bracket 600 are the same or similar in structure and/or function, at least in part, to the exemplary mounting bracket 100 described above and shown in FIGS. 1-3 and 7-12, and therefore the description above directed to like components, aspects, configurations, functions or processes (and the alternative embodiments thereof) equally applies to the mounting bracket 600.

As shown in FIG. 13, the mounting bracket 600 differs from the mounting bracket 100 in that the mounting bracket 600 is void of the hook portions 110. Further, the mounting bracket 600 includes a support or cross member 605 that extends across an upper portion of the slot 616 of the track portion. In some embodiments, the support member 605 may be positioned above the rotation portions of the track portion. In some other embodiments, the support member 605 may be positioned between the curved lip end portions 617 and the rotation portions.

The mounting bracket 600 and the support member 605 may be configured to support and hang an object via an arm member (rather than hook portions, for example). For example, the arm member may be configured to engage the support member 605 to prevent the arm member from sliding down the track portion to the curved lip end portions 617 and/or further lock the arm member in the closed position.

Figure 14:
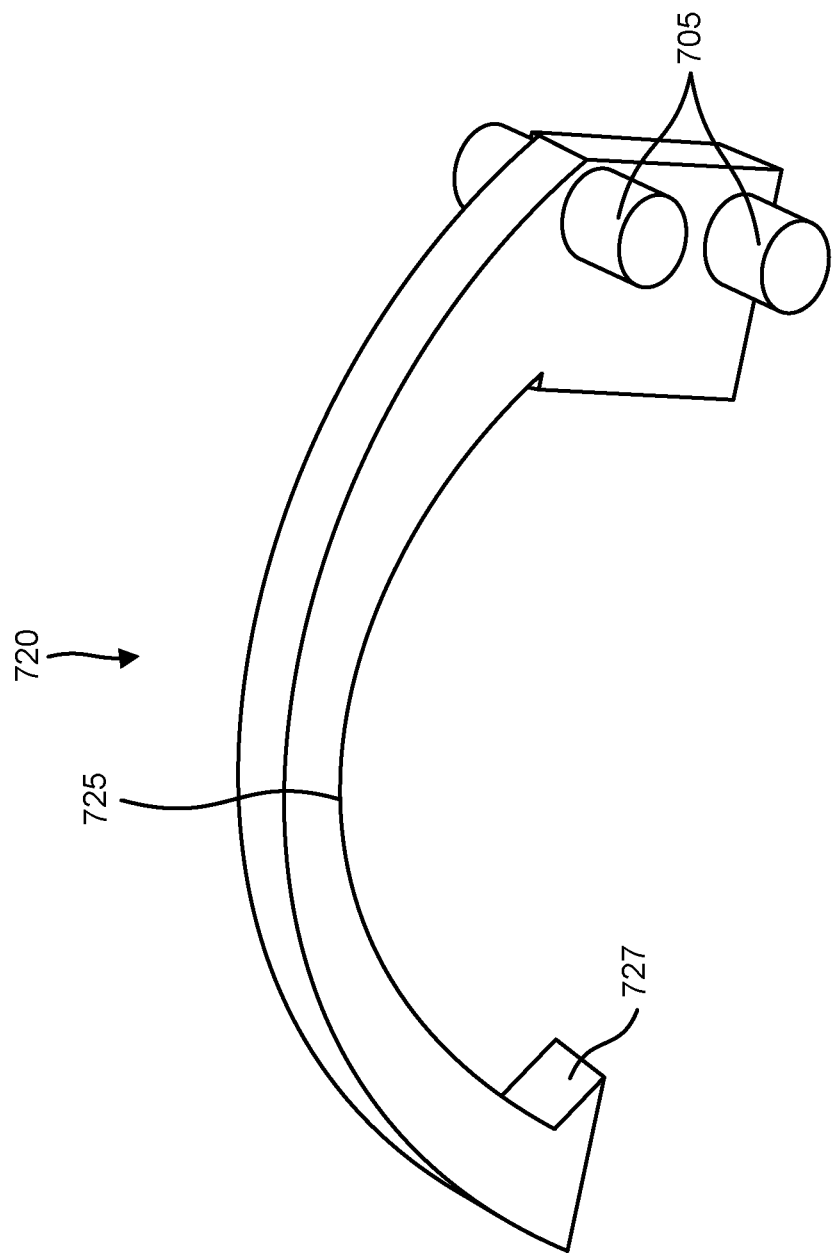
FIG. 14 illustrates an elevational perspective view of another exemplary locking arm in accordance with an embodiment of the present disclosure.

An exemplary embodiment of a self-locking device for hanging objects on a mounting surface 795 according to the present disclosure is shown in FIG. 14 and generally indicated with the reference numeral 700. Some aspects, elements and/or functions of exemplary self-locking device 700 are the same or similar in structure and/or function, at least in part, to the exemplary self-locking device 300 described above and shown in FIGS. 1-12, and therefore the description above directed to like components, aspects, configurations, functions or processes (and the alternative embodiments thereof) equally applies to the self-locking device 700. Further, the mounting bracket 711 of the self-locking device 700 is substantially similar to the mounting bracket 600 of FIG. 13, and therefore the description above directed to like components, aspects, configurations, functions or processes (and the alternative embodiments thereof) equally applies to the mounting bracket 711.

Figure 15:
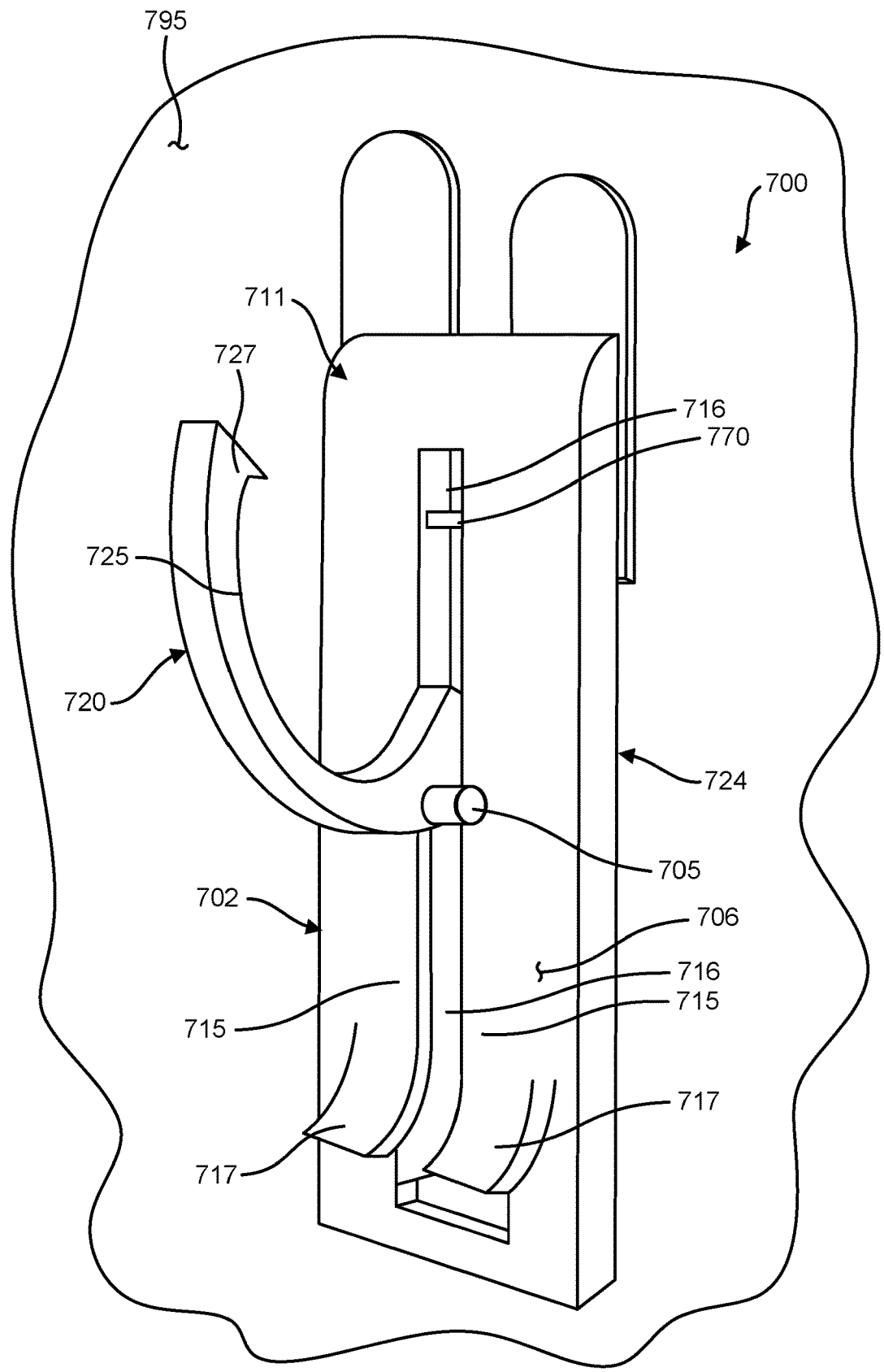
FIG. 15 illustrates a perspective view of another exemplary self-locking hanging device with the locking arm thereof in an open orientation in accordance with an embodiment of the present disclosure.
Figure 16:
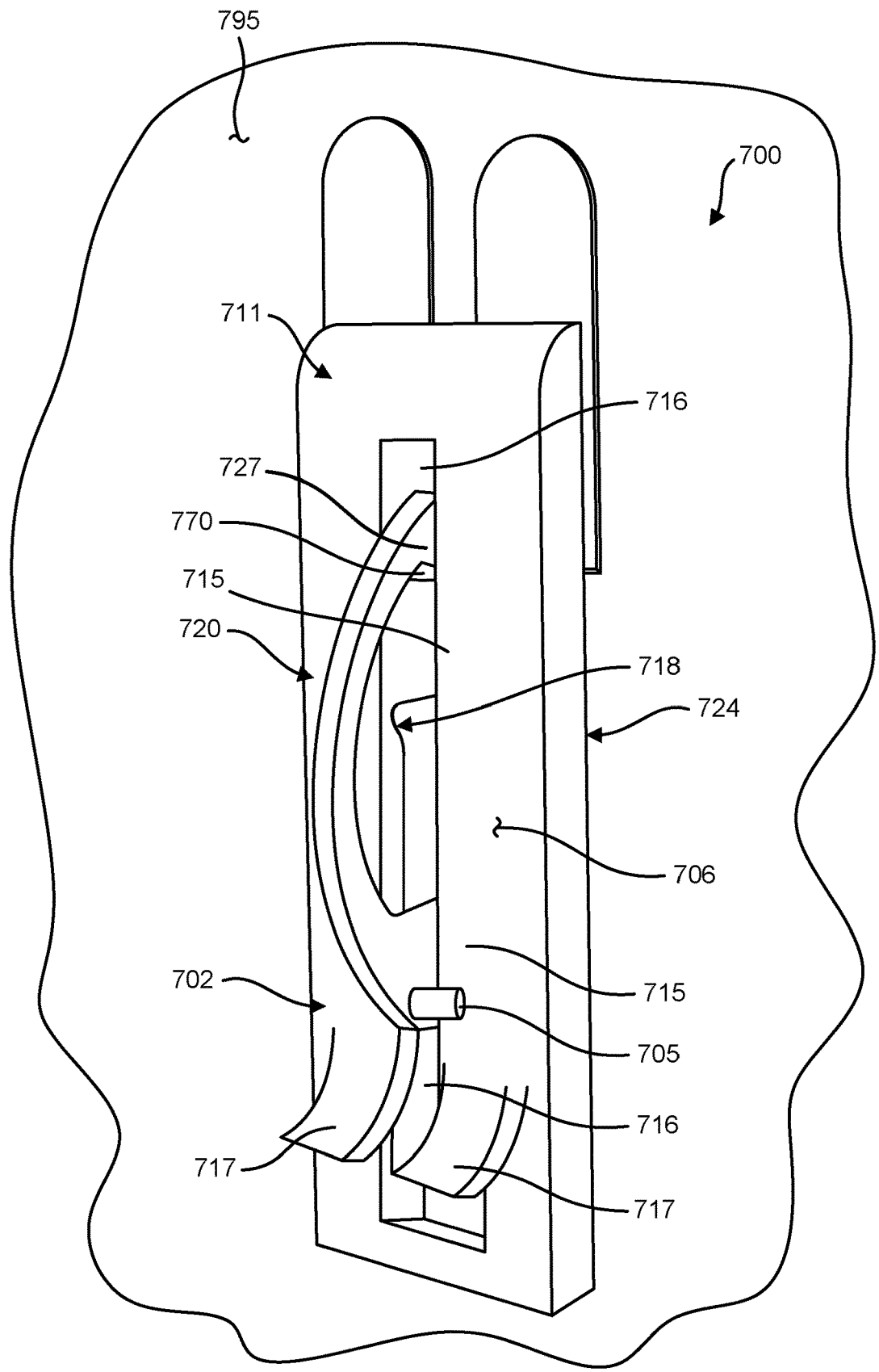
FIG. 16 illustrates a perspective view of the exemplary self-locking hanging device of FIG. 15 with the locking arm thereof in a closed orientation in accordance with an embodiment of the present disclosure.
Figure 17:
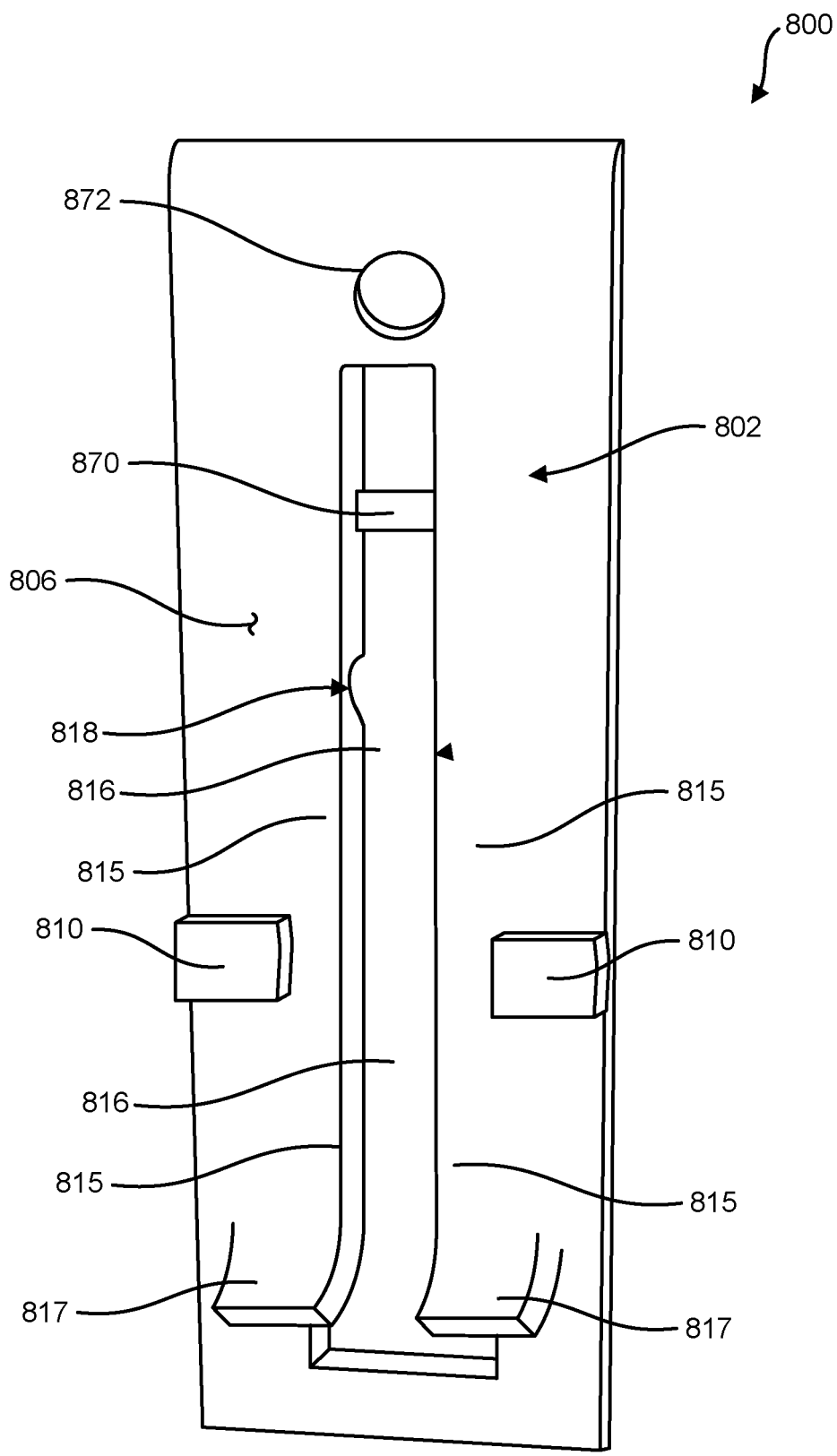
FIG. 17 illustrates a perspective view of another exemplary mounting bracket of a self-locking hanging device in accordance with an embodiment of the present disclosure.

As shown in FIGS. 14 and 15, the self-locking device 700 may include an arm member 720 that differs from arm member 200 in that the underside 725 of the arm member 720 is void of a projection and defines a concave shape. Further, the arm member 720 defines a general arcuate shape that is defined by a smaller radius than that of the arm member 200. The arm member 720 may be particularly advantageous hanging small objects (keys, jewelry, handbags, etc.) via the arm member 720. For example, the arm member 720 may be particularly advantageous for use with the mounting bracket 711 that is void of hook portions, as shown in FIGS. 16 and 17, for example. The hooked tip portion 727 of the arm member 720 may be configured to engage or hang on the support or cross member 770 of the mounting bracket 711 that extends across an upper portion of the slot 716 of the track portion of the mounting bracket 711 to maintain the arm member 720 in the closed position, as shown in FIGS. 16 and 17.

As also shown in FIGS. 15 and 16, the mounting bracket 711 may be integral or of one piece-construction (potentially monolithic). The backside 724 of the mounting bracket 711 (opposing the front face 706 of the front side 702) may thereby be coupled to and abut the mounting surface 795 in use. The mounting bracket 711 may thereby include an opening or recess (not shown, see FIGS. 3 and 19) about the track portion such that the mounting surface 795 does not interfere with the operation of the arm member 720 and the track portion of the mounting bracket 711 (e.g., the pair of posts 705 of the arm member 720 operating along the guide portions 715 to the curved lip end portions 717 and/or the rotation portions 718 of the mounting bracket 711).

Figure 18:
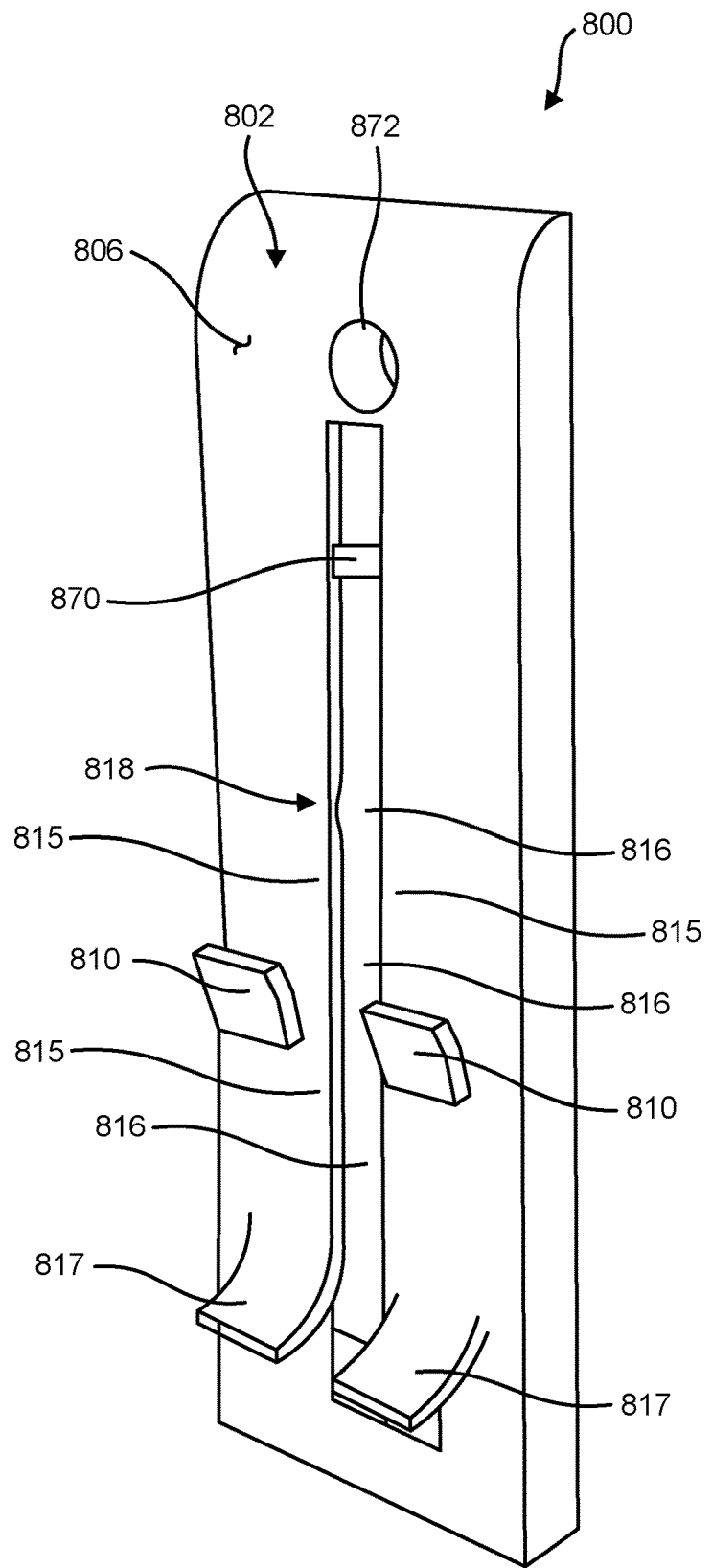
FIG. 18 illustrates a side perspective view of the exemplary mounting bracket of FIG. 17.
Figure 19:
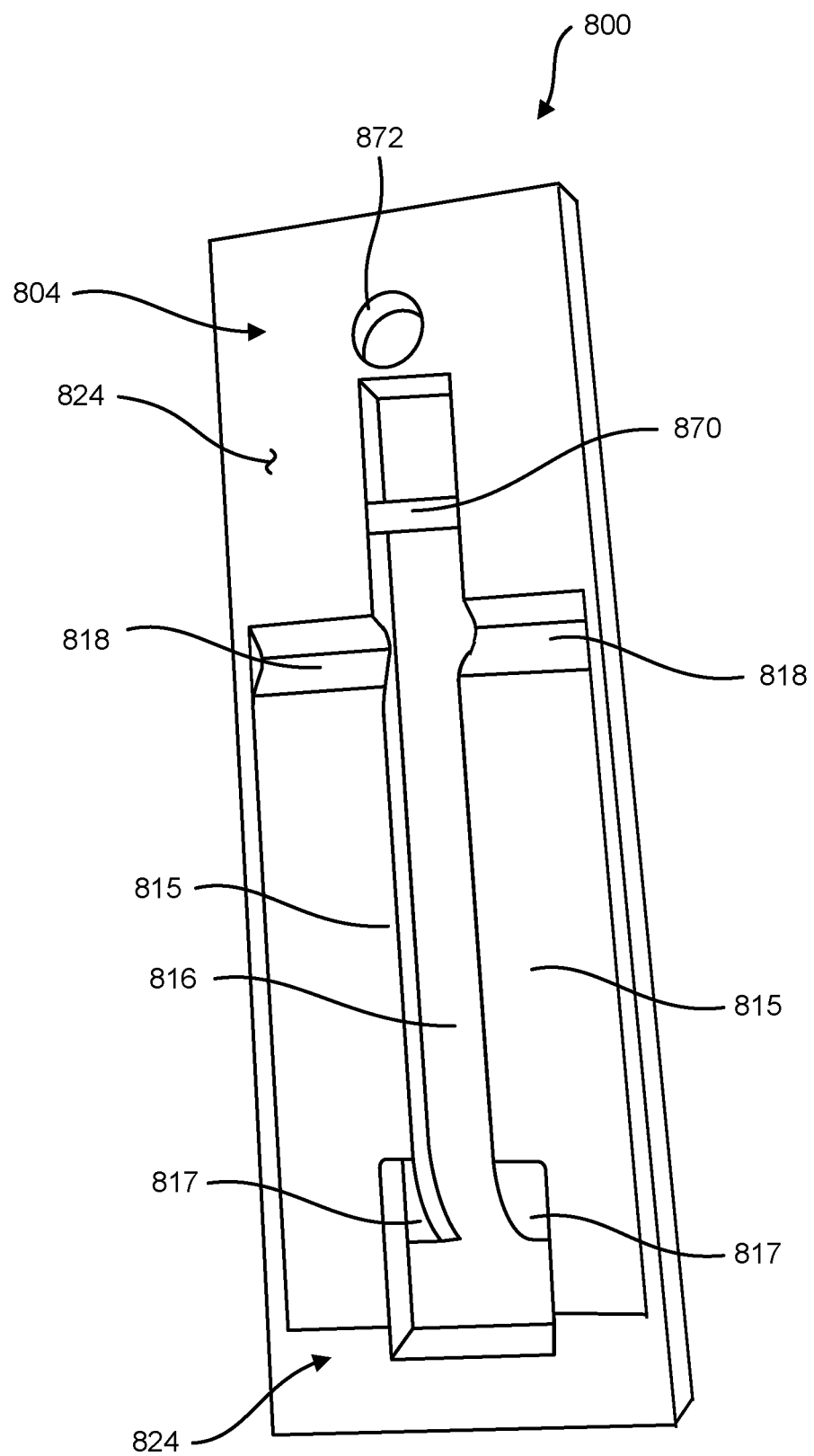
FIG. 19 illustrates a rear perspective view of the exemplary mounting bracket of FIG. 17.

Another exemplary embodiment of a mounting bracket for a self-locking device for hanging objects on a mounting surface according to the present disclosure is shown in FIGS. 17-19 and generally indicated with the reference numeral 800. Some aspects, elements and/or functions of exemplary mounting bracket 800 are the same or similar in structure and/or function, at least in part, to the exemplary mounting bracket 100 described above and shown in FIGS. 1-3 and 7-12, the exemplary mounting bracket 600 described above and shown in FIG. 13, and the exemplary mounting bracket 711 described above and shown in FIGS. 15 and 16, and therefore the description above directed to like components, aspects, configurations, functions or processes (and the alternative embodiments thereof) equally applies to the mounting bracket 800.

As shown in FIGS. 17 and 18, the mounting bracket 800 differs from the mounting bracket 100 in that the hook portions 810 are positioned between the curved lip end portions 817 and the rotation portions 818 of the track portion. Further, mounting bracket 800 includes a through aperture or hole 872 above the slot 816 that extends from the front face 806 to the backside surface 824, as shown in FIGS. 17 and 19. The aperture 872 may be utilized to affix the mounting bracket 800 to a mounting surface, such as via a fastener (e.g., a nail or screw) extending therethrough and into the mounting surface.

The mounting bracket 800 also differs from the mounting bracket 100 and the mounting bracket 711 in that the mounting bracket 800 includes both the hook portions 810 and the support or cross member 870 in the slot 816 of the track portion.

As also shown in FIGS. 17-19, the mounting bracket 800 differs from the mounting bracket 13 in that it is integral or of one piece-construction (potentially monolithic). As shown in FIG. 19, the back side 804 of the mounting bracket 800 includes an opening or recess aligned with the track portion such that the track portion is spaced from the backside surface 824 that coupled to and abuts the mounting surface. The opening or recess aligned in the back side 804 of the mounting bracket 800 thereby prevents the mounting surface from interfering with the operation of an arm member and the track portion of the mounting bracket 800 (e.g., the guide portions 815 and/or rotation portions 818 of the mounting bracket 800).

It is believed that the present embodiments enable objects to be secured to a mounting surface in a locked manner, without the need for special equipment or tools. The present embodiment does not require the object being hung to be altered, and does not requires a special hanging hardware on the object. The present embodiments thereby allow for easy mounting and removal of objects on mounting surfaces.

In some applications, the self-locking devices of the present disclosure may be mounted in different ways and/or on different mounting surfaces to provide various different functions. For example, without limitation, some embodiments may be mounted on a table, floor or other horizontal or non-vertical mounting surface. For example, such embodiments may serve to attach an object to a floor, such as a broom or sweeping device (e.g., latch the handle of the broom to the floor). Other such embodiments may be used for attaching larger items to a horizontal or non-vertical mounting surface (e.g., a snow blower, lawnmower, etc.), such as via a wire or other member/device to substantially inhibit the device from moving around in the mounting surface. The mounting bracket and/or locking arm mechanism in such embodiments may be larger, and potentially made of a metal material (such as, but not limited to, steel). In some other embodiments, the mounting surface may be a ceiling or other elevated downwardly-facing surface. For example, the mounting surface may be a ceiling and the self-locking device may be utilized to hold hanging plants or other objects to the ceiling. In some embodiments configured for elevated downwardly-facing mounting surfaces, the self-locking device may comprise inversely curved hanging hooks/arms and/or a locking mechanism that may be manually guided along the track portion.

In some embodiments, the track portion, guide portions, curved end portions or a combination thereof be separate and distinct components from the mounting bracket (and/or themselves) that are coupled to the mounting bracket. Such embodiments may also comprise a locking or arm mechanism with posts that engage with the tracks. It is contemplated that in some embodiments with the track portion being a distinct component comprising one or two distinct guide portions, the guide portions may include the curved end portions at one end and notches in the opposite ends. However, the track portion, guide portion and/or curved end portions may be altered to function differently than those described by way of example in the foregoing.

While the inventions have been described in detail in connection with only a limited number of embodiments, it should be readily understood that the inventions are not limited to such disclosed embodiments. Rather, the inventions can be modified to incorporate any number of variations, alterations, substitutions or equivalent arrangements not heretofore described, but which are commensurate with the spirit and scope of the inventions. Additionally, while various embodiments of the inventions have been described, it is to be understood that aspects of the disclosure may include only some of the described embodiments, and aspects on one embodiment may equally or similarly be incorporated into any other embodiment. For example, the components and features of the mounting brackets of FIGS. 1-2 and 7-12, FIG. 3, FIG. 13, FIGS. 15 and 16 and FIGS. 17-19 may be used interchangeably and in alternative combinations as would be modified or altered by one of ordinary skill in the art. As another example, the components and features of the locking arm members of FIGS. 4-12, FIG. 14 and FIGS. 15 and 16 may be used interchangeably and in alternative combinations as would be modified or altered by one of ordinary skill in the art. Accordingly, the inventions are not to be seen as limited by the foregoing description, but is only limited by the scope of the appended claims.

This written description uses examples to disclose the inventions, including the best mode, and also to enable any person skilled in the art to practice the inventions, including making and using any devices or systems and performing any incorporated methods. The patentable scope of the inventions are defined by the claims, and may include other examples that occur to those skilled in the art. For example, such other examples are intended to be within the scope of the claims, such as if they have structural elements that do not differ from the literal language of the claims or if they include equivalent structural elements with insubstantial differences from the literal language of the claims.

In addition, many modifications may be made to adapt a particular aspect, function or material to the teachings of the various embodiments without departing from their scope. While any dimensions and/or types of materials described herein are intended to define the parameters of the various embodiments, they are by no means limiting and are merely exemplary.

Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Also, the terms "coupled", "affixed" or the like are used herein to refer to both connections resulting from separate, distinct components being directly or indirectly coupled together and components being integrally formed (e.g., of one-piece construction or monolithic).

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment.

Those skilled in the art will recognize that the devices, systems and techniques described herein may be embodied or carried out in a manner that achieves or optimizes one advantage or group of advantages as taught herein without necessarily achieving other objects or advantages as may be taught or suggested herein.

The invention claimed is:

1. A self-locking device for hanging an object on a mounting surface, comprising:
   a mounting bracket for coupling to the mounting surface comprising a front side, a back side for engaging the mounting surface, and a track portion, wherein the track portion comprises a pair of guide portions, a pair of lip portions extending from a lower end of the guide portions and away from the front side that define free ends, a pair of rotation portions extending from an upper end of the guide portions, and a slot extending between the pairs of guide portions, lip portions and rotation portions; and
   a locking arm member for holding an object between the mounting bracket and the arm member mated with the track portion of the mounting bracket such that the arm member is translatable along the track portion, the arm member comprising a tip portion, a base portion positioned at least partially within the slot, and at least two pairs of projections extending from the base portion that engage with one of the pairs of guide portions, lip portions and rotation portions depending upon the position of the arm member along the track portion,
   wherein the lip portions and the arm member are configured such that when the at least two pairs of projections engage a portion of the pair of lip portions, each lip portion extends between respective pair of projections of the at least two pairs of projections, and the arm member is oriented with respect the mounting bracket such that the arm member extends through the slot and at least the tip portion is positioned past the back side of the mounting bracket,
   wherein the guide portions and the arm member are configured such that when the at least two pairs of projections engage the pair of guide portions, the guide portions extend between a respective pair of projections of the at least two pairs of projections, and the arm member is oriented with respect the mounting bracket in a closed orientation with the tip portion being positioned proximate to the front side of the mounting bracket, and
   wherein the rotation portions and the arm member are configured such that when the at least two pairs of projections engage the pair of rotation portions, the rotation portions extend between a respective pair of projections of the at least two pairs of projections, and the arm member is freely rotatable with respect to the mounting bracket between the closed orientation and an open orientation with the tip portion being positioned distal to the front side of the mounting bracket as compared to the closed orientation.

2. The device of claim 1, wherein, in the closed orientation, the tip portion of the arm member extends only partially through the slot, is positioned even with the front side of the mounting bracket or is spaced above the front side of the mounting bracket by less than or equal to 15 degrees.

3. The device of claim 1, wherein, in the open orientation, the tip portion of the arm member is spaced above the front side of the mounting bracket by less than or equal to 120 degrees.

4. The device of claim 1, wherein the back side of the mounting bracket comprises an engagement surface for engaging the mounting surface and a recessed portion aligned with the track portion, the recessed portion comprising underside surfaces of at least the pairs of guide portions and rotation portions that are spaced from the engagement surface.

5. The device of claim 1, wherein the lip portions are arcuate members that extend from a front face of the front side of the mounting bracket, and wherein the lip portions each comprise an arcuately concave front face.

6. The device of claim 1, wherein, in the closed orientation of the arm member, the arm member is configured such that a gap extends below an underside of the arm member and above the front side of the mounting bracket.

7. The device of claim 6, wherein, in the closed orientation of the arm member, a portion of the object extends through the gap.

8. The device of claim 1, wherein the track portion further comprises a support member that extends across the slot, and wherein the rotation portions are positioned between the support member and the lip portions along the track portion.

9. The device of claim 8, wherein the tip portion of the arm member comprises a hook projection, and wherein the hook projection is configured to engage the support member when the arm member is in the closed orientation and positioned in a locking position along the track portion.

10. The device of claim 1, wherein the mounting bracket further comprises at least one hook portion extending from the front side, the at least one hook portion including at least one upper support surface configured to physically support a portion of the object thereon.

11. The device of claim 1, wherein a first guide portion of the pair of guide portions and a first rotation recess of the pair of rotation recesses comprise contiguous and aligned first planar front surfaces at the front side of the mounting bracket on a first side of the slot, and a second guide portion of the pair of guide portions and a second rotation recess of the pair of rotation recesses comprise contiguous and aligned second planar front surfaces at the front side of the mounting bracket on a second side of the slot.

12. The device of claim 1, wherein the pair of rotation recesses comprise rear recesses in a back side thereof.

13. The device of claim 1, wherein the pair of rotation recesses comprise first thicknesses extending between a front face thereof at the front side and a back face thereof at the back side, wherein the pair of guide portions comprise second thicknesses extending between a front face thereof at the front side and a back face thereof at the back side, and wherein the first thicknesses are less than the second thicknesses.

14. The device of claim 1, wherein the projections of each pair of projections are spaced a first distance apart, wherein the lip portions each define a first thickness between a front face thereof and a back face thereof, and wherein the first distances and the first thicknesses are relatively sized such that a portion of the lip portions securely orients the arm member such that the arm member is prevented from rotating with respect to the mounting such that the tip portion of the is not positioned past the back side of the mounting bracket.

15. The device of claim 1, wherein, when the back side of the mounting bracket is coupled to and abuts the mounting surface, the mounting surface prevents the member arm from translating fully over the lip portions by preventing the arm member from orienting with respect to the mounting bracket such that the tip portion extends past the back side of the mounting bracket.

16. The device of claim 1, wherein the projections of each pair of projections are spaced a first distance apart, wherein the guide portions each define a first thickness between a front face thereof and a back face thereof, and wherein the first distances and the first thicknesses are relatively sized such that the guide portions securely orient the arm member in the closed orientation such that the arm member is prevented from rotating with respect to the mounting bracket out of the closed orientation.

17. The device of claim 1, wherein the projections of each pair of projections are spaced a first distance apart, wherein the rotation portions each define a minimum thickness between a front face thereof and a back face thereof, and wherein the first distances and the minimum thicknesses are relatively sized such that the arm member is freely rotatable with respect to the mounting bracket between the closed orientation and the open orientation.

18. A method of hanging an object on a mounting surface, comprising:
   obtaining a self-locking device, comprising:
      a mounting bracket comprising a front side, a back side, and a track portion, wherein the track portion comprises a pair of guide portions, a pair of lip portions extending from a lower end of the guide portions and away from the front side that define free ends, a pair of rotation portions extending from an upper end of the guide portions, and a slot extending between the pairs of guide portions, lip portions and rotation portions; and
      a locking arm member comprising a tip portion, a base portion configured to be positioned at least partially within the slot, and at least two pairs of projections extending from the base portion configured to engage with one of the pairs of guide portions, lip portions and rotation portions,
   mounting the arm member on the pair of lip portions such that the base portion is positioned at least partially within the slot, each lip portion extends between a respective pair of projections of the at least two pairs of projections, and the arm member is oriented with respect the mounting bracket such that the arm member extends through the slot and at least the tip portion is positioned past the back side of the mounting bracket;
   translating the arm member along the pair of lip portions to the pair of guide portions such that each guide portion extends between a respective pair of projections of the at least two pairs of projections, and the arm member is oriented with respect the mounting bracket in a closed orientation with the tip portion being positioned proximate to the front side of the mounting bracket;
   translating the arm member along the pair of guide portions in the closed orientation to the pair of rotation portions such that each guide portion is mounted on the rotation with the rotation portions extending between a respective pair of projections of the at least two pairs of projections;
   rotating the arm member on the pair of guide portions from the closed orientation to an open orientation with the tip portion being positioned distal to the front side of the mounting bracket as compared to the closed orientation;
   positioning a portion of an object between the arm member and the front side of the mounting bracket; and
   rotating the arm member on the pair of guide portions from the open orientation to the closed orientation.

19. The method of claim 18, further comprising coupling the mounting bracket to the mounting surface such that the back side abuts the mounting surface after rotating the arm member on the pair of guide portions from the open orientation to the closed orientation.

20. The method of claim 18, wherein the pair of rotation recesses comprise first thicknesses extending between a front face thereof at the front side and a back face thereof at the back side, wherein the pair of guide portions comprise second thicknesses extending between a front face thereof at the front side and a back face thereof at the back side, and wherein the first thicknesses are less than the second thicknesses.

* * * * *